(12) United States Patent
Nishita et al.

(10) Patent No.: US 10,879,014 B2
(45) Date of Patent: Dec. 29, 2020

(54) CARBONACEOUS MATERIAL FOR ELECTRIC DOUBLE LAYER CAPACITORS AND METHOD FOR PRODUCING SAME

(71) Applicant: KURARAY CO., LTD., Kurashiki (JP)

(72) Inventors: Yumika Nishita, Kurashiki (JP); Shushi Nishimura, Kurashiki (JP); Yoshifumi Egawa, Kurashiki (JP); Kiyoto Otsuka, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/349,489

(22) PCT Filed: Nov. 13, 2017

(86) PCT No.: PCT/JP2017/040771
§ 371 (c)(1),
(2) Date: May 13, 2019

(87) PCT Pub. No.: WO2018/092721
PCT Pub. Date: May 24, 2018

(65) Prior Publication Data
US 2019/0341202 A1  Nov. 7, 2019

(30) Foreign Application Priority Data

Nov. 15, 2016  (JP) .................................. 2016-222502

(51) Int. Cl.
| | | |
|---|---|---|
| C01B 31/08 | (2006.01) | |
| H01G 11/34 | (2013.01) | |
| H01G 11/24 | (2013.01) | |
| H01G 11/44 | (2013.01) | |
| H01G 11/86 | (2013.01) | |
| C01B 32/30 | (2017.01) | |

(52) U.S. Cl.
CPC ............. H01G 11/34 (2013.01); C01B 32/30 (2017.08); H01G 11/24 (2013.01); H01G 11/44 (2013.01); H01G 11/86 (2013.01)

(58) Field of Classification Search
CPC ................................ C01B 32/30; H01G 11/34
See application file for complete search history.

(56) References Cited

U.S. PATENT DOCUMENTS

| | | | |
|---|---|---|---|
| 6,865,068 B1 * | 3/2005 | Murakami ............. | H01G 11/24 361/502 |
| 7,625,839 B2 * | 12/2009 | Hirahara ................ | H01G 11/24 502/432 |
| 8,926,932 B2 * | 1/2015 | Pfeifer .................... | B01J 20/20 252/502 |
| 2002/0126439 A1 | 9/2002 | Sato et al. | |
| 2004/0160728 A1 | 8/2004 | Oyama et al. | |
| 2006/0240979 A1 | 10/2006 | Hirahara et al. | |
| 2010/0142121 A1 | 6/2010 | Fujii et al. | |
| 2010/0276631 A1 | 11/2010 | Mabuchi et al. | |
| 2012/0202033 A1 | 8/2012 | Chang et al. | |
| 2014/0118884 A1 | 5/2014 | Lin et al. | |
| 2015/0375197 A1 | 12/2015 | Yanagi et al. | |

FOREIGN PATENT DOCUMENTS

| | | |
|---|---|---|
| CN | 102067256 | 5/2011 |
| CN | 1033470756 | 10/2013 |
| CN | 104620343 | 5/2015 |
| CN | 105706200 | 6/2016 |
| EP | 2 214 236 | 8/2010 |
| JP | 2002-128514 A | 5/2002 |
| JP | 2004-189587 A | 7/2004 |
| JP | 2006-179558 A | 7/2006 |
| JP | 2007-186411 | 7/2007 |
| JP | 2010-168238 A | 8/2010 |
| JP | 4618929 B2 | 1/2011 |
| JP | 2011-176043 A | 9/2011 |
| JP | 2012-204496 A | 10/2012 |
| JP | 5202460 B2 | 6/2013 |
| JP | 5317659 B2 | 10/2013 |
| JP | 5463144 B2 | 4/2014 |
| WO | 2008/053919 | 5/2008 |
| WO | 2012/092210 | 7/2012 |

(Continued)

OTHER PUBLICATIONS

International Search Report dated Feb. 6, 2018 in PCT/JP2017/040771 (submitting English translation only), 2 pages.

(Continued)

*Primary Examiner* — Stuart L Hendrickson
(74) *Attorney, Agent, or Firm* — Grüneberg and Myers PLLC

(57) ABSTRACT

A carbonaceous material for electric double-layer capacitors that is based on a plant-derived carbon precursor, in which carbonaceous material: a BET specific surface area is 1,900 to 2,500 m$^2$/g; an average pore size is 2.2 to 2.6 nm as determined by a nitrogen adsorption method; a volume of micropores having a pore size of 2 nm or smaller is 0.84 to 1.30 cm$^3$/g as determined by the MP method; a ratio of a volume of micropores having a pore size of 1 to 2 nm with respect to the volume of the micropores having a pore size of 2 nm or smaller is 25 to 50% as determined by the MP method; and a volume of mesopores having a pore size of 2 to 50 nm is 0.16 to 0.4 cm$^3$/g as determined by the BJH method.

16 Claims, 9 Drawing Sheets

(56) References Cited

FOREIGN PATENT DOCUMENTS

WO     WO 2014/129410 A1     8/2014
WO     2015/146459     10/2015

OTHER PUBLICATIONS

International Preliminary Report on patentability and Written Opinion dated May 31, 2019 in PCT/JP2017/040771 (submitting English translation only), 6 pages.
Mikhail, R. SH., et al., "Investigations of a Complete Pore Structure Analysis", Journal of Colloid and Interface Science, vol. 26, 1968, pp. 45-53.
Lippens, B.C., et al., "Studies on Pore Systems in Catalysis V. The t Method", Journal of Catalysis, vol. 4, 1965, pp. 319-323.
Barrett, E.P., et al., "The Determination of Pore Volume and Area Distributions in Porous Substances. I. Computations from Nitrogen Isotherms", J. Amer. Chem. Soc., vol. 73, 1951, pp. 373-380.
Chinese Office Action dated Mar. 19, 2020 in Chinese Patent Application No. 201780069756.3 with English translation, 15 pages.
Extended European Search Report dated Jun. 8, 2020 in European Application No. 17871392.1.
Chinese Office Action dated Aug. 31, 2020 in Chinese Patent Application No. 201780069756.3 with English translation, 12 pages.

\* cited by examiner

[FIG. 1]
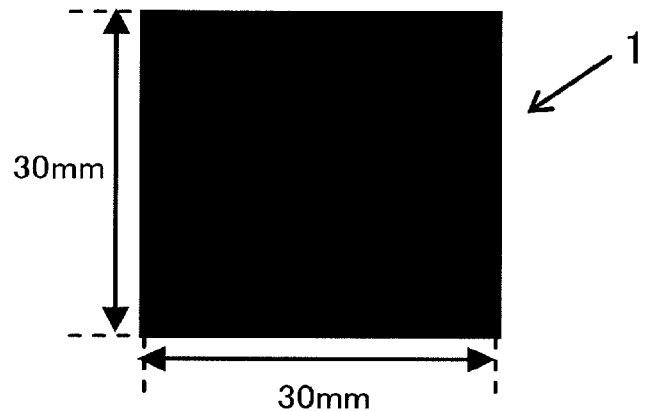
[FIG. 2]
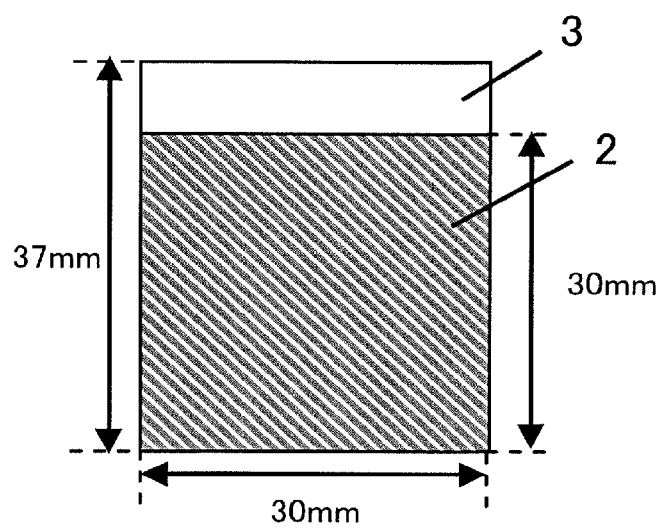

[FIG. 3]
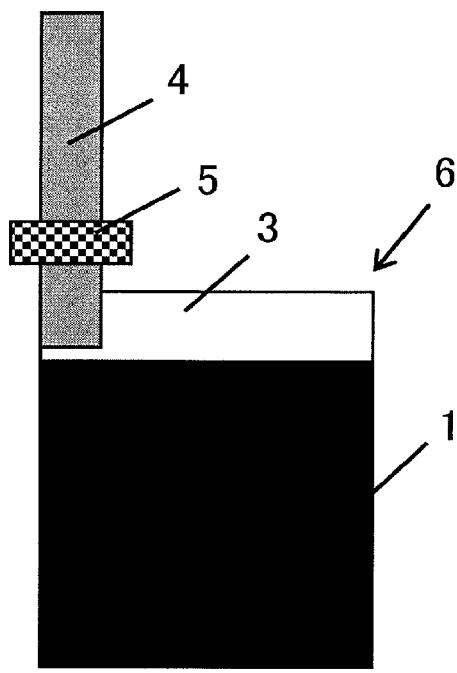
[FIG. 4]
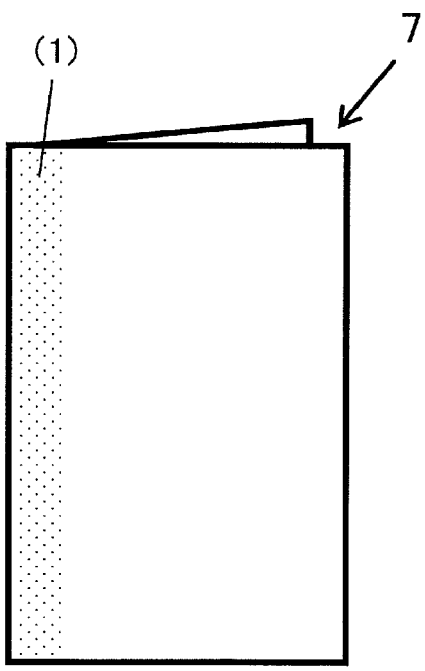

[FIG. 5]
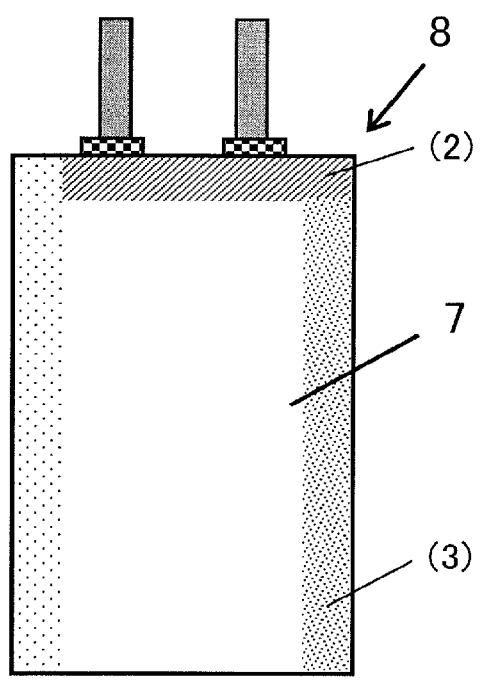

[FIG. 6]
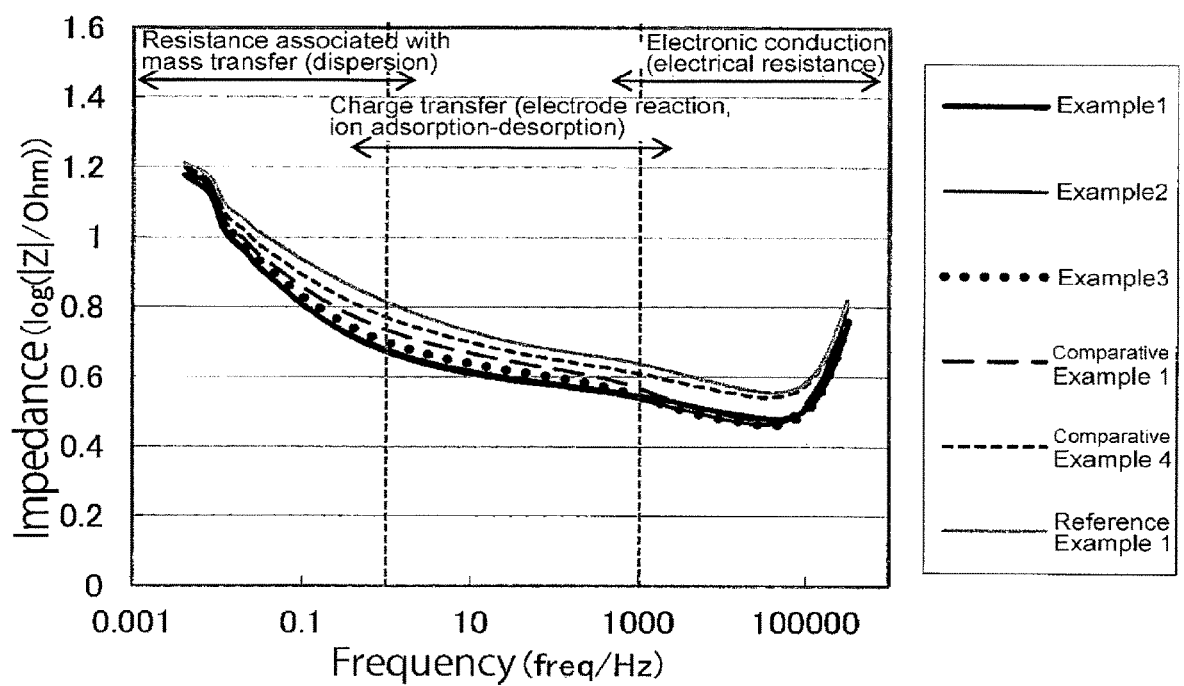

[FIG. 7]
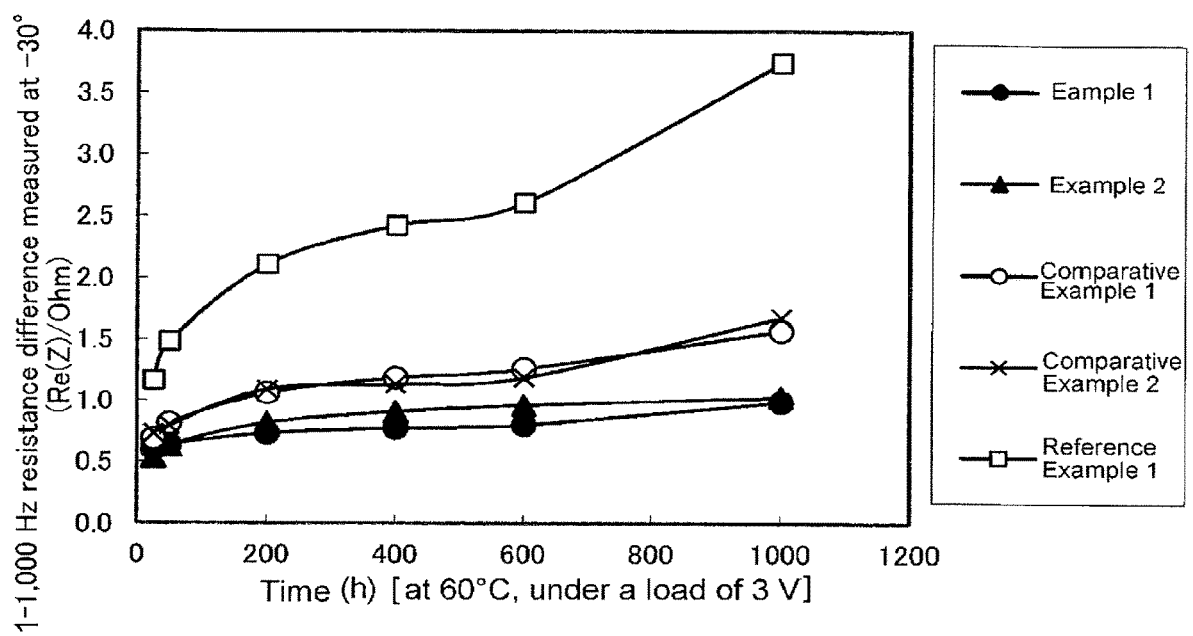

[FIG. 8]
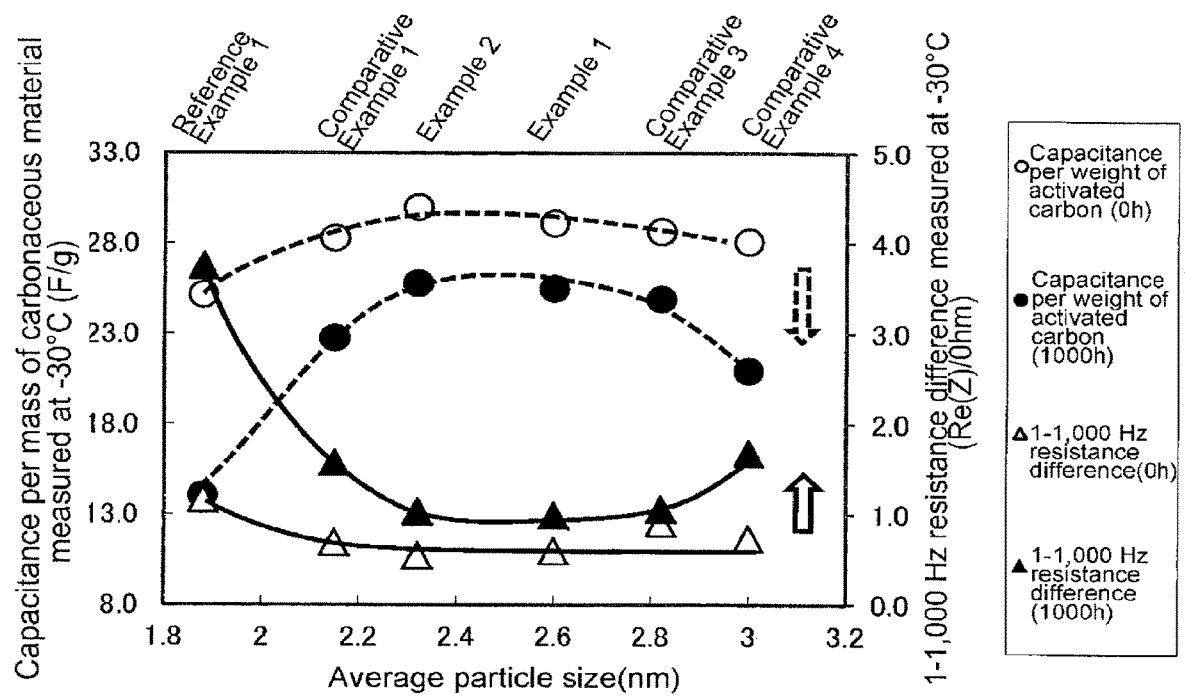

[FIG. 9]
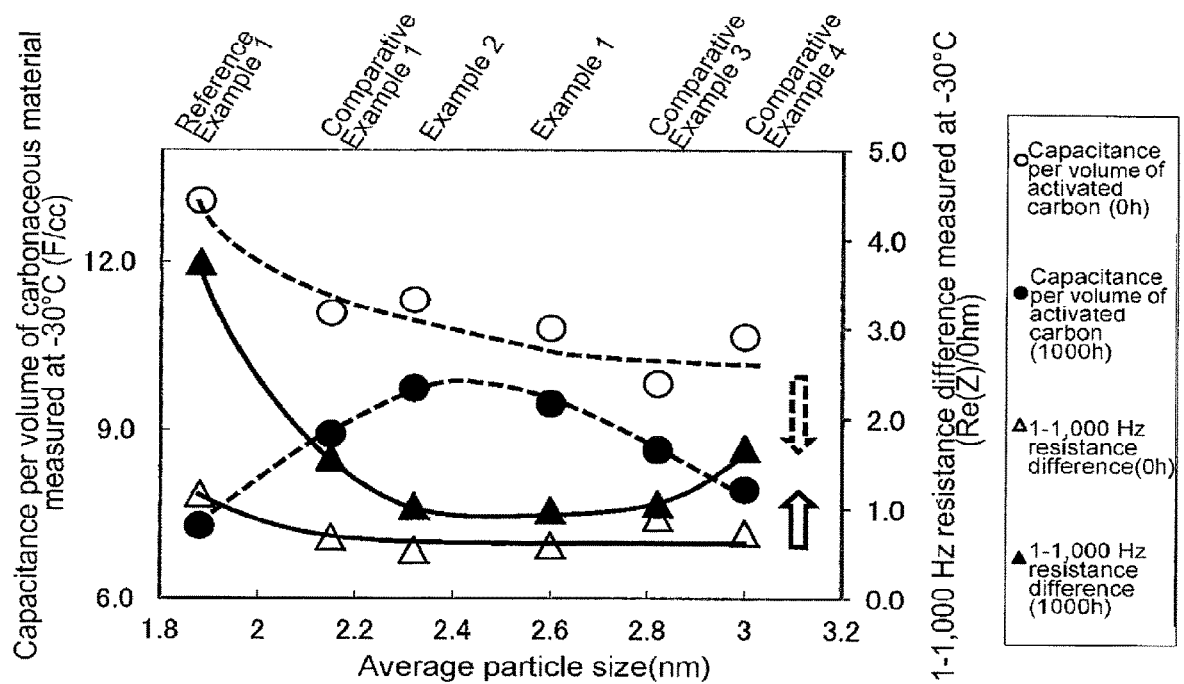

[FIG. 10]
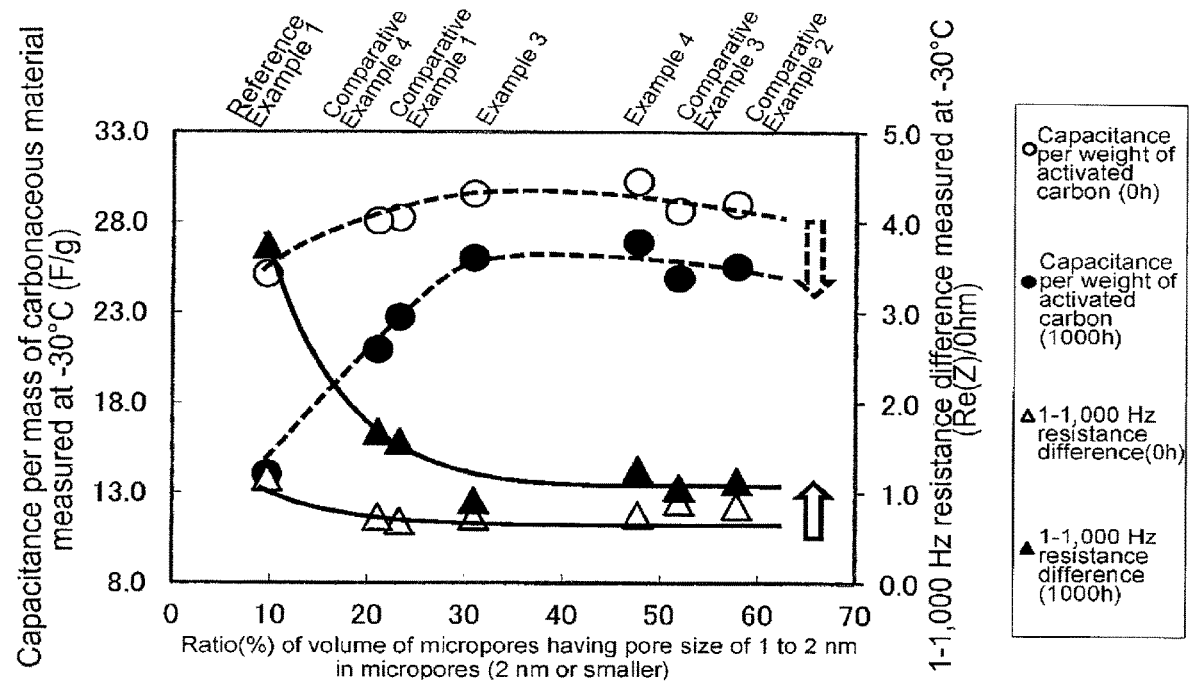

[FIG. 11]
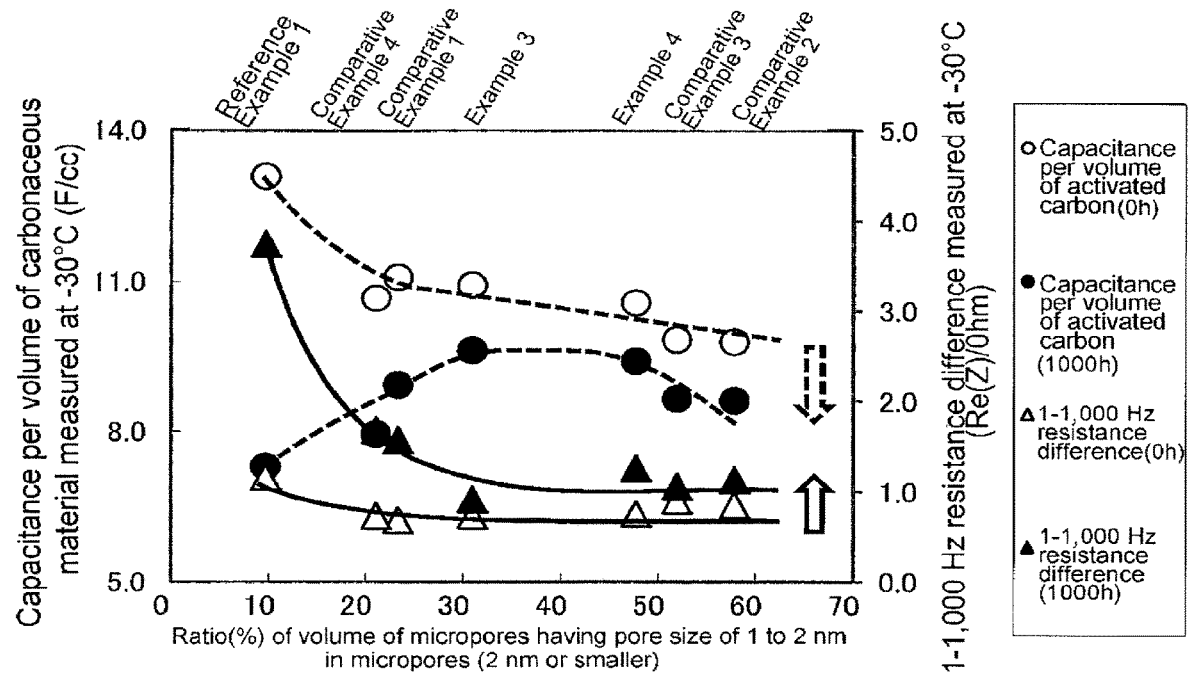

CARBONACEOUS MATERIAL FOR ELECTRIC DOUBLE LAYER CAPACITORS AND METHOD FOR PRODUCING SAME

TECHNICAL FIELD

This patent application claims priority under the Paris Convention based on Japanese Patent Application No. 2016-222502 (filed on Nov. 15, 2016), which is incorporated herein by reference in its entirety.

The present invention relates to a carbonaceous material for electric double-layer capacitors, and a method of producing the same. More particularly, the present invention relates to: a carbonaceous material for electric double-layer capacitors, which is effective for improvement of durability and improvement of withstand voltage; and a method of producing the same.

BACKGROUND ART

Electric double-layer capacitors, which are one type of energy storage devices, utilize the capacity (electric double-layer capacity) obtained solely from physical adsorption and desorption of ions without involving any chemical reaction and, therefore, have excellent output characteristics and life characteristics as compared to batteries. Because of such characteristics, many electric double-layer capacitors have been developed in power storage applications, such as back-up of various memories, power generation by natural energy and UPS (Uninterruptible Power Supplies). In recent years, from the standpoint of the above-described excellent characteristics and prompt measures for environmental problems, electric double-layer capacitors have been drawing attention as auxiliary power sources of electric vehicles (EV) and hybrid vehicles (HV) as well as in storage applications of regenerative energy. However, in those electric double-layer capacitors to be mounted on vehicles, not only a higher energy density but also superior durability under more severe service conditions (such as temperature environment) than the conditions of consumer use as well as a further improvement in capacitance are demanded.

In response to such demands, electric double-layer capacitors that are allowed to have satisfactory durability under severe conditions by controlling the BET specific surface area, the average pore size and the like have been reported. For example, Patent Literature 1 discloses an activated charcoal having a BET specific surface area and a pore size in specific ranges, and it is also disclosed that an electric double-layer capacitor in which this activated charcoal is used as an electrode has a high output density per volume and excellent durability. However, there were still problems in terms of improvement in durability, reduction of internal resistance and the like over a longer period. In addition, Patent Literature 2 discloses an activated carbon-containing electric double-layer capacitor which has excellent capacitance and internal resistance; however, when the activated carbon disclosed in this Patent Literature is used, due to its excessively large pore size, the bulk density of an electrode is reduced and the capacitance per volume may thus be reduced.

Patent Literature 3 discloses that an electric double-layer capacitor having excellent internal resistance and output density and high durability can be obtained by adjusting the alkali metal content in an activation raw material through immersion in an alkali and subsequent washing, increasing the volume of pores having a specific pore size through activation of the raw material, and thereby controlling the BET specific surface area and the average pore size.

However, although the use of the activated carbon disclosed in this Patent Literature yields good results with regard to the resistance, the capacitance per volume is insufficient in some cases.

Patent Literatures 4 and 5 disclose activated carbons for positive electrodes of lithium power storage devices, which activated carbons have a BET specific surface area, a pore size and a pore size distribution in specific ranges. These activated carbons disclosed in these Patent Literatures are activated carbons for positive electrodes of lithium power storage devices; therefore, it is difficult to apply them to ordinary electric double-layer capacitors. When these activated carbons are applied, their pore volume and average pore size may result in insufficient durability and a reduction in the capacitance in the capacitors.

CITATION LIST

Patent Literatures

[Patent Literature 1] Japanese Patent No. 4618929
[Patent Literature 2] Japanese Patent No. 5202460
[Patent Literature 3] Japanese Unexamined Patent Publication (Kokai) No. 2011-176043
[Patent Literature 4] Japanese Patent No. 5317659
[Patent Literature 5] Japanese Patent No. 5463144

SUMMARY OF INVENTION

Technical Problem

The present invention was made in view of the above-described circumstances, and an object of the present invention is to provide: a carbonaceous material for electric double-layer capacitors, which is effective for improvement of durability and improvement of withstand voltage; and a method of producing the same.

Solution to Problem

In order to solve the above-described problems, the present inventors conducted detailed and intensive studies on carbonaceous materials for electric double-layer capacitors and production methods thereof, thereby arriving at the present invention.

That is, the present invention encompasses the following preferred modes.

[1] A carbonaceous material for electric double-layer capacitors, which is based on a plant-derived carbon precursor, wherein a BET specific surface area is 1,900 to 2,500 $m^2/g$, an average pore size is 2.2 to 2.6 nm as determined by a nitrogen adsorption method, a volume of micropores having a pore size of 2 nm or smaller is 0.84 to 1.30 $cm^3/g$ as determined by the MP method, a ratio of a volume of micropores having a pore size of 1 to 2 nm with respect to the volume of the micropores having a pore size of 2 nm or smaller is 25 to 50% as determined by the MP method, and a volume of mesopores having a pore size of 2 to 50 nm is 0.16 to 0.4 $cm^3/g$ as determined by the BJH method.

[2] The carbonaceous material for electric double-layer capacitors according to [1], having a total pore volume of 1.0 to 1.50 $cm^3/g$ as calculated from a nitrogen adsorption amount at a relative pressure $P/P_0$ of 0.99 on a nitrogen adsorption-desorption isotherm.

[3] The carbonaceous material for electric double-layer capacitors according to [1] or [2], having a tap density of 0.21 to 0.25 g/cm$^3$.

[4] The carbonaceous material for electric double-layer capacitors according to any one of [1] to [3], wherein the carbon precursor is derived from a coconut shell.

[5] A method of producing the carbonaceous material for electric double-layer capacitors according to any one of [1] to [4], wherein the method comprises performing carbonization, primary activation with water vapor, washing, and secondary activation with water vapor on the plant-derived carbon precursor to obtain the carbonaceous material, an elemental potassium content in the carbonaceous material after the washing is 500 ppm or less, and an elemental iron content in the carbonaceous material after the washing is 200 ppm or less.

[6] An electrode for electric double-layer capacitors, the electrode comprising the carbonaceous material according to any one of [1] to [5].

[7] An electric double-layer capacitor comprising the electrode for electric double-layer capacitors according to [6].

Advantageous Effects of Invention

The carbonaceous material for electric double-layer capacitors according to the present invention has micropores required for reducing the resistance, and excessive development of mesopores therein, which causes a reduction in the capacity per volume, can be suppressed. Therefore, when the carbonaceous material for electric double-layer capacitors according to the present invention is used in an electrode, an increase in the resistance of an electric double-layer capacitor is suppressed, the durability such as performance retention rate is improved, and the withstand voltage is increased. In addition, an electrode containing the carbonaceous material for electric double-layer capacitors according to the present invention can be suitably utilized as an electrode for electric double-layer capacitors and lithium ion capacitors that are demanded to have high durability.

BRIEF DESCRIPTION OF DRAWINGS

FIG. 1 is a drawing that illustrates a sheet-form electrode composition.

FIG. 2 is a drawing that illustrates a current collector (etching aluminum foil) coated with a conductive adhesive.

FIG. 3 is a drawing that illustrates a polarizable electrode formed by bonding the sheet-form electrode composition and the current collector and ultrasonically welding thereto an aluminum tab.

FIG. 4 is a drawing that illustrates a pouch-like outer package sheet.

FIG. 5 is a drawing that illustrates an electric double-layer capacitor.

FIG. 6 is a graph (Bode-Plot) showing the relationships between the frequency and the resistance of carbonaceous materials for electric double-layer capacitors in constant-voltage AC impedance measurement performed at −30° C.

FIG. 7 is a graph showing the changes with time in the resistance difference of carbonaceous materials between 1 Hz and 1,000 Hz in constant-voltage AC impedance measurement performed at −30° C. in durability test (at 60° C., with a load of 3V for a prescribed time) of the carbonaceous materials.

FIG. 8 is a graph showing the relationships among the average pore size of carbonaceous materials for electric double-layer capacitors, the capacitance per mass of the carbonaceous materials measured at −30° C. after the durability test, and the difference in resistance between 1 Hz and 1,000 Hz.

FIG. 9 is a graph showing the relationships among the average pore size of carbonaceous materials for electric double-layer capacitors, the capacitance per volume of the carbonaceous materials measured at −30° C. after the durability test, and the difference in resistance between 1 Hz and 1,000 Hz.

FIG. 10 is a graph showing the relationships among the ratio of the volume of micropores having a pore size of 1 to 2 nm with respect to the volume of micropores having a pore size of 2 nm or smaller in carbonaceous materials for electric double-layer capacitors, the capacitance per mass of the carbonaceous materials measured at −30° C. after the durability test, and the difference in resistance between 1 Hz and 1,000 Hz.

FIG. 11 is a graph showing the relationships among the ratio of the volume of micropores having a pore size of 1 to 2 nm with respect to the volume of micropores having a pore size of 2 nm or smaller in carbonaceous materials for electric double-layer capacitors, the capacitance per volume of the carbonaceous materials measured at −30° C. after the durability test, and the difference in resistance between 1 Hz and 1,000 Hz.

DESCRIPTION OF EMBODIMENTS

The carbonaceous material for electric double-layer capacitors according to the present invention is a carbonaceous material based on a plant-derived carbon precursor, wherein the BET specific surface area is 1,900 to 2,500 m$^2$/g; the average pore size is 2.2 to 2.6 nm as determined by a nitrogen adsorption method; the volume of micropores having a pore size of 2 nm or smaller is 0.84 to 1.30 cm$^3$/g as determined by the MP method; the ratio of the volume of micropores having a pore size of 1 to 2 nm with respect to the volume of the micropores having a pore size of 2 nm or smaller is 25 to 50% as determined by the MP method; and the volume of mesopores having a pore size of 2 to 50 nm is 0.16 to 0.4 cm$^3$/g as determined by the BJH method.

The carbonaceous material for electric double-layer capacitors according to the present invention has a BET specific surface area of 1,900 to 2,500 m$^2$/g. Generally, the capacitance per unit area is constant. Therefore, when the BET specific surface area is smaller than 1,900 m$^2$/g, the capacitance per unit mass is excessively small. Meanwhile, when the BET specific surface area is larger than 2,500 m$^2$/g, the bulk density of an electrode that is produced using activated carbon for electrodes is reduced, resulting in an excessively small capacitance per volume. From the standpoint of improving both the capacitance per unit mass and the capacitance per volume, the BET specific surface area is preferably 1,950 to 2,450 m$^2$/g, more preferably 2,000 to 2,400 m$^2$/g. With regard to the internal resistance, since it is largely influenced by the specific surface area as well as the average pore size, the pore distribution and the pore volume, it is necessary to take these properties into consideration in a comprehensive manner.

The carbonaceous material for electric double-layer capacitors according to the present invention has an average pore size of 2.2 to 2.6 nm. An average pore size of smaller than 2.2 nm is not desirable since it leads to an increase in ion transfer resistance in the pores. Further, an average pore size of larger than 2.6 nm is also not desirable since it leads to a reduction in the electrode density. From the standpoint of reducing the ion transfer resistance in the pores and increasing the electrode density, the average pore size is preferably 2.25 to 2.55 nm, more preferably 2.3 to 2.5 nm.

The BET specific surface area and the average pore size are determined by a nitrogen adsorption method and can be measured by, for example, the respective methods described below in the section of Examples.

In the carbonaceous material for electric double-layer capacitors according to the present invention, the volume of micropores having a pore size of 2 nm or smaller, which is determined by the MP method for the carbonaceous material for electric double-layer capacitors according to the present invention, is 0.84 to 1.30 cm$^3$/g. When the volume of the micropores having a pore size of 2 nm or smaller is less than 0.84 cm$^3$/g, the pores do not develop sufficiently, so that the specific surface area and the capacitance may be reduced, which is not desirable. Meanwhile, when the volume of the micropores having a pore size of 2 nm or smaller is greater than 1.30 cm$^3$/g, mesopores are excessively increased due to the development of micropores, so that the bulk density of electrode and the capacitance per volume are reduced, which is also not desirable. From the standpoint of increasing the capacitance, the volume of the micropores having a pore size of 2 nm or smaller is preferably 0.90 to 1.25 cm$^3$/g, more preferably 1.00 to 1.20 cm$^3$/g.

Further, in the carbonaceous material for electric double-layer capacitors according to the present invention, the ratio of the volume of micropores having a pore size of 1 to 2 nm with respect to the volume of micropores having a pore size of 2 nm or smaller (this ratio is hereinafter also referred to as "ratio A"), which is determined by the MP method for the carbonaceous material for electric double-layer capacitors according to the present invention, is 25 to 50%. The ratio A is calculated by the following formula:

$$\text{Ratio } A = \frac{\text{(Volume of micropores having a pore size of 1 to 2 nm as determined by the } MP \text{ method)}}{\left(\begin{array}{c}\text{(Volume of micropores having a pore size of 2} \\ \text{nm or smaller as determined by the } MP \text{ method)}\end{array}\right)} \times 100$$

A ratio A of lower than 25% is not desirable since it leads to an increase in the electrode internal resistance and makes it difficult to remove water adsorbed to the carbonaceous material. Meanwhile, a ratio A of higher than 50% is also not desirable since it leads to a reduction in the bulk density and thus a reduction in the capacitance per volume. From the standpoint of reducing the internal resistance and the water content of the electrode and improving the capacitance, the ratio A is preferably 25 to 48%, more preferably 27 to 45%.

The MP method, which was devised by M. Mikhail, Brunauer and Bodor, is a method of determining micropore volume, micropore area and micropore distribution by utilizing a "t-plot" (B. C. Lippens and J. H. de Boer, J. Catalysis, 4319 (1965)). In the present invention, the pore volume can be determined by applying the MP method to a nitrogen adsorption-desorption isotherm measured by a nitrogen adsorption method.

In the carbonaceous material for electric double-layer capacitors according to the present invention, the volume of mesopores having a pore size of 2 to 50 nm, which is determined by the BJH method, is 0.16 to 0.4 cm$^3$/g. When the volume of the mesopores having a pore size of 2 to 50 nm is smaller than the above-described lower limit value, the electrode internal resistance is increased and the output characteristics are deteriorated, which is not desirable. When the volume of the mesopores having a pore size of 2 to 50 nm is larger than the above-described upper limit value, the bulk density of the electrode is reduced and the capacitance per volume is thus reduced, which is also not desirable. From the standpoint of improving the output characteristics and the capacitance, the volume of the mesopores is preferably 0.18 to 0.38 cm$^3$/g, more preferably 0.19 to 0.35 cm$^3$/g.

The BJH method, which was proposed by Barrett, Joyner, Halenda, et al., is a calculation method generally used for analysis of mesopores similarly to the CI method and the DH method. In the present invention, the pore volume can be determined by applying the BJH method to a nitrogen adsorption-desorption isotherm measured by a nitrogen adsorption method.

In the carbonaceous material for electric double-layer capacitors according to the present invention, the total pore volume, which is calculated from the nitrogen adsorption amount at a relative pressure $P/P_0$ of 0.99 on a nitrogen adsorption-desorption isotherm, is preferably 1.0 to 1.5 cm$^3$/g, more preferably 1.20 to 1.45 cm$^3$/g, still more preferably 1.25 to 1.40 cm$^3$/g. The total pore volume is desirably in this range since a good balance between the capacitance and the resistance is thereby attained. The total pore volume can be calculated from the nitrogen adsorption amount at a relative pressure $P/P_0$ of 0.99 on a nitrogen adsorption-desorption isotherm measured by a nitrogen adsorption method.

The carbonaceous material for electric double-layer capacitors according to the present invention has a tap density of preferably 0.21 to 0.25, more preferably 0.22 to 0.24, still more preferably 0.225 to 0.235. The tap density is preferably not lower than the above-described lower limit value since this is likely to increase the electrode density and the capacity per volume. Meanwhile, the tap density is preferably not higher than the above-described upper limit value since this is likely to reduce the electrode internal resistance and to increase the capacitance per volume.

The tap density can be determined by filling the carbonaceous material into a container and subsequently tapping the container using TAPDENSER KYT-4000 manufactured by Seishin Enterprise Co., Ltd.

The carbonaceous material for electric double-layer capacitors according to the present invention has an average particle size of preferably 30 μm or smaller, more preferably 20 μm or smaller, but preferably 2 μm or larger, more preferably 4 μm or larger. The average particle size can be determined using, for example, a particle size/particle size distribution analyzer (e.g., "MICROTRAC MT3000" manufactured by Nikkiso Co., Ltd.).

In the present invention, the plant-derived carbon precursor is not particularly restricted, and examples thereof include coconut shells, coffee beans, tea leaves, sugarcane, fruits (e.g., mandarin oranges and bananas), straws, rice husks, broad-leaved trees, coniferous trees, and bamboos. These exemplified materials also include wastes generated after the use of the respective materials for their original purposes (e.g., used tea leaves) and portions of plant materials (e.g., banana peels and mandarin orange peels). These plant materials may be used singly, or in combination of two or more thereof. Among these plant materials, a coconut shell is preferred since it is readily available and can yield a carbonaceous material having various properties.

The coconut shell is not particularly restricted, and examples thereof include coconut shells of palm trees (oil palm), coconut palm, Salak, double coconut and the like. These coconut shells may be used singly, or in combination of two or more thereof. Coconut shells of coconut palm and oil palm, which are biomass wastes generated in large amounts after the utilization of coconuts as food, detergent raw materials, biodiesel oil raw materials or the like, are particularly preferred from the standpoint of their availability.

The carbonaceous material for electric double-layer capacitors according to the present invention, particularly an activated carbon, can be produced by a method that comprises obtaining a carbonaceous material through carbonization, primary activation, washing, and higher-order activation of a plant-derived carbon precursor.

A system used for the carbonization and the activation is not particularly restricted and, for example, a known system such as a fixed bed system, a moving bed system, a fluidized bed system, a multiple bed system, or a rotary kiln can be employed.

In the production method of the carbonaceous material for electric double-layer capacitors according to the present invention, first, a plant-derived carbon precursor is carbonized. The carbonization method is not particularly restricted, and examples thereof include a method of calcinating the plant-derived carbon precursor at a temperature of about 400 to 800° C. under an atmosphere of an inert gas, such as nitrogen, carbon dioxide, helium, argon, carbon monoxide or a fuel combustion gas, a mixed gas of these inert gases, or a mixed gas of an inert gas and other gas containing any of the above-described inert gases as a main component.

After the carbonization of the carbon precursor, primary activation is performed. As an activation method, a gas activation method or a chemical activation method can be employed; however, in the present invention, a gas activation method is preferred from the standpoint of reducing the amount of residual impurities. The gas activation method can be performed by allowing the carbonized carbon precursor to react with an activation gas (e.g., water vapor and/or carbon dioxide).

In the primary activation, from the standpoint of allowing the activation to efficiently proceed, it is preferred to use a mixture of water vapor and the same inert gas as the one used in the carbonization, and the partial pressure of water vapor in this process is preferably in a range of 10 to 60%. When the partial pressure of water vapor is 10% or higher, the activation is likely to proceed sufficiently, whereas when the partial pressure of water vapor is 60% or lower, a rapid activation reaction is suppressed and this makes it easier to control the reaction.

The total amount of the activation gas to be supplied in the primary activation is preferably 50 to 10,000 parts by mass, more preferably 100 to 5,000 parts by mass, still more preferably 200 to 3,000 parts by mass, with respect to 100 parts by mass of the carbon precursor. When the total amount of the supplied activation gas is in this range, the activation reaction can proceed more efficiently.

The activation temperature in the primary activation is usually 700 to 1,100° C., preferably 800 to 1,000° C. The activation time and the heating rate are not particularly restricted and are variable depending on the type, shape, size, desired pore size distribution and the like of the plant-derived carbon precursor to be selected. An increase in the activation temperature or an extension of the activation time in the primary activation tends to increase the BET specific surface area of the resulting carbonaceous material. Therefore, in order to obtain a carbonaceous material having a BET specific surface area in the desired range, the activation temperature and/or the activation time may be adjusted.

The primary activation is preferably performed until the BET specific surface area of the carbonaceous material to be obtained thereafter reaches 1,000 to 1,750 $m^2/g$ or so. In this case, in the subsequent washing process, pores from which impurities contained therein are efficiently removable can be formed.

Next, the carbonaceous material obtained after the primary activation is washed. The washing can be performed by immersing the carbonaceous material obtained after the primary activation in an acid-containing washing liquid. The washing liquid may be, for example, a mineral acid or an organic acid. Examples of the mineral acid include hydrochloric acid and sulfuric acid. Examples of the organic acid include saturated carboxylic acids, such as formic acid, acetic acid, propionic acid, oxalic acid, tartaric acid, and citric acid; and aromatic carboxylic acids, such as benzoic acid and terephthalic acid. From the standpoint of washing properties, the acid used in the washing liquid is preferably a mineral acid, more preferably hydrochloric acid. After being washed with an acid, the carbonaceous material is preferably further washed with water or the like to remove excess acid. By this operation, the load applied to the activation equipment in secondary activation and thereafter can be reduced.

The washing liquid can be usually prepared by mixing an acid and an aqueous solution. Examples of the aqueous solution include water and a mixture of water and a water-soluble organic solvent. Examples of the water-soluble organic solvent include alcohols, such as methanol, ethanol, propylene glycol, and ethylene glycol.

The concentration of the acid in the washing liquid is not particularly restricted and may be adjusted as appropriate in accordance with the type of the acid to be used. The acid concentration of the washing liquid is preferably 0.01 to 3.5% by mass, more preferably 0.02 to 2.2% by mass, still more preferably 0.03 to 1.6% by mass, based on the total amount of the washing liquid. The acid concentration of the washing liquid is preferably in the above-described range since this enables to efficiently remove impurities contained in the carbonaceous material.

The pH of the washing liquid is not particularly restricted and may be adjusted as appropriate in accordance with, for example, the type of the acid to be used and the subject to be removed.

The temperature of the washing liquid into which the carbonaceous material is immersed is not particularly restricted; however, it is preferably 0 to 98° C., more preferably 10 to 95° C., still more preferably 15 to 90° C. The temperature of the washing liquid into which the carbonaceous material is immersed is desirably in the above-described range since this enables to perform the washing with the practical time and the load on the equipment being reduced.

The method of washing the carbonaceous material is not particularly restricted as long as the carbonaceous material can be immersed in the washing liquid, and the method may be one in which the washing liquid is continuously added and retained for a prescribed time and immersion is performed while extracting the washing liquid, or one in which the carbonaceous material is immersed and retained in the washing liquid for a prescribed time and, after removing the washing liquid, fresh washing liquid is added and this immersion-liquid removal operation is repeated. Further, the method may be one in which the whole washing liquid is renewed or one in which the washing liquid is partially renewed. The duration of immersing the carbonaceous material in the washing liquid may be adjusted as appropriate in accordance with the acid to be used, the concentration of the acid, the treatment temperature and the like.

The duration of the washing is not particularly restricted; however, from the standpoint of the economic efficiency of the reaction equipment and the structure retainability of the carbonaceous material, it is preferably 0.05 to 4 hours, more preferably 0.1 to 3 hours.

When the carbonaceous material is immersed in the washing liquid, the mass ratio of the washing liquid and the carbonaceous material may be adjusted as appropriate in accordance with the type, concentration, temperature and the like of the washing liquid to be used. The mass of the carbonaceous material to be immersed is usually 0.1 to 50% by mass, preferably 1 to 20% by mass, more preferably 1.5 to 10% by mass, with respect to the mass of the washing liquid. When the mass of the carbonaceous material is in this range, not only impurities eluted into the washing liquid are unlikely to precipitate out of the washing liquid and re-adhesion of the impurities to the carbonaceous material is thus likely to be suppressed but also an appropriate volume efficiency is attained; therefore, such an amount of the carbonaceous material is desirable from the standpoint of economic efficiency.

The atmosphere in which the washing is performed is not particularly restricted and may be selected as appropriate in accordance with the method employed for the washing. In the present invention, the washing is usually performed in the air atmosphere.

The washing may be performed once or plural times using a single kind of washing liquid, or may be performed plural times using a combination of two or more kinds of washing liquids.

By the washing, impurities contained in the carbonaceous material can be removed. The impurities originate from the plant-derived carbon precursor, and examples thereof include alkali metals, such as lithium, sodium, and potassium; alkaline earth metals, such as beryllium, magnesium, and calcium; and transition metals, such as iron, copper, and nickel.

In the present invention, the elemental potassium content in the carbonaceous material after the washing is preferably 500 ppm or less, more preferably 150 ppm or less, still more preferably 120 ppm or less. In the present invention, because of the use of the carbonaceous material based on a plant-derived carbon precursor, elemental potassium can be a main component as an impurity. Therefore, it is believed that, with the elemental potassium content being reduced in the carbonaceous material after the washing, the content of other impurities are reduced as well. It is noted here that the elemental potassium content in the carbonaceous material after the washing is preferably as low as possible, and the lower limit value thereof is 0 ppm or higher, for example, 6 ppm or higher.

In the present invention, the elemental iron content in the carbonaceous material after the washing is preferably 200 ppm or less, more preferably 150 ppm or less, still more preferably 100 ppm or less. In the present invention, examples of representative elements that can contaminate the production process include elemental iron, and it is believed that, with the elemental iron content being reduced in the carbonaceous material after the washing, the content of other impurities that can contaminate the production process are reduced as well. It is noted here that the elemental iron content in the carbonaceous material after the washing is preferably as low as possible, and the lower limit value thereof is 0 ppm or higher, for example, 3 ppm or higher.

The details of the measurement of the elemental potassium content and the elemental iron content are as described below in the section of Examples, and a microwave sample pretreatment apparatus (e.g., "DISCOVER SP-D80" manufactured by CEM Corporation) and an ICP emission spectrometer ("iCAP6200" manufactured by Thermo Fisher Scientific K.K.) can be employed.

The impurities cause acceleration of the pore formation more than necessary since they function as auxiliary agents of the activation reaction in the activation with water vapor. Particularly, the impurities are concentrated as the activation proceeds; therefore, their function may be further promoted to hinder the formation of pores of desired size in a later stage of a high activation treatment (e.g., a BET specific surface area of 1,900 $m^2/g$ or larger). The method of producing the carbonaceous material of the present invention is not particularly restricted; however, in a preferred mode of the present invention, first, the pore formation is allowed to proceed with a large amount of impurities being included and the basic skeletons of pores are efficiently formed through the primary activation, and the impurities that can function as auxiliary agents of the activation reaction are subsequently removed by the washing to suppress rapid progress of the activation, whereby the formation of optimal pores can be promoted in the subsequent higher-order activation, as a result of which the carbonaceous material of the present invention can be obtained.

In the present invention, secondary activation is performed on the carbonaceous material obtained after the washing. The secondary activation can be performed under the same conditions as those of the primary activation. In the secondary activation as well, an increase in the activation temperature or an extension of the activation time tends to increase the BET specific surface area of the resulting carbonaceous material. Therefore, in order to obtain a carbonaceous material having a BET specific surface area in the desired range, the activation temperature and/or the activation time may be adjusted. The same also applies to the below-described tertiary activation and higher-order activation.

After the secondary activation, tertiary activation may be performed, and higher-order activation may be further performed. In addition, washing may be performed between such activations performed after the secondary activation. From the standpoint of economic efficiency, activation is performed up to the secondary activation or the tertiary activation. In the present invention, the tertiary activation and the higher-order activation can also be performed under the same conditions as those of the primary activation.

In the present invention, the elemental potassium content in the carbonaceous material after the secondary or higher-order activation is preferably 1,000 ppm or less, more preferably 500 ppm or less, still more preferably 300 ppm or less. In order to control the elemental potassium content in this preferred range, it is preferred to adjust the amount of impurities after the preceding primary activation. When the elemental potassium content in the carbonaceous material after the secondary or higher-order activation is in the above-described range, rapid progress of activation can be suppressed, so that desired pores are likely to be formed. It is noted here that this elemental potassium content is also preferably as low as possible, and the lower limit value thereof is 0 ppm or higher, for example, 6 ppm or higher.

In the present invention, the elemental iron content in the carbonaceous material after the secondary or higher-order activation is preferably 300 ppm or less, more preferably 250 ppm or less, still more preferably 200 ppm or less. In order to control the elemental iron content in this preferred range, it is preferred to adjust the amount of impurities after the preceding primary activation. When the elemental iron content in the carbonaceous material after the secondary or higher-order activation is in the above-described range, similarly to the case of the elemental potassium content, rapid progress of activation can be suppressed, so that desired pores are likely to be formed. It is noted here that this elemental iron content is also preferably as low as possible, and the lower limit value thereof is 0 ppm or higher, for example, 6 ppm or higher.

The carbonaceous material obtained after the secondary activation or higher-order activation is preferably further washed to remove ash and metal impurities that are contained in the carbonaceous material. In addition, the carbonaceous material obtained after the secondary activation or higher-order activation may be heat-treated at 500 to 1,500° C. under an inert gas atmosphere or a vacuum atmosphere to thermally remove residues after the washing and to remove unwanted surface functional groups, whereby carbon crystallization may be further enhanced to increase the electroconductivity.

In the present invention, the carbonaceous material obtained in the above-described manner is subsequently pulverized. The pulverization method is not particularly restricted, and any known pulverization method using a ball mill, a roll mill, a jet mill or the like, or a combination of such methods can be employed. The average particle size of the carbonaceous material after the pulverization is not particularly restricted; however, from the standpoint of improving the electrode density and reducing the internal resistance, it is preferably 30 μm or smaller, more preferably 20 μm or smaller, but preferably 2 μm or larger, more preferably 4 μm or larger.

In the present invention, the thus pulverized carbonaceous material may be classified as well. For example, by removing particles having a particle size of 1 μm or smaller, activated carbon particles having a narrow particle size distribution width can be obtained. By the removal of such fine particles, the amount of the binder to be used in the electrode formation can be reduced. The classification is not particularly restricted, and examples thereof include classification using sieve, wet classification, and dry classification. Examples of a wet classifier include classifiers utilizing the principle of gravitational classification, inertial classification, hydraulic classification, centrifugal classification or the like. Examples of a dry classifier include classifiers utilizing the principle of sedimentation classification, mechanical classification, centrifugal classification or the like. From the standpoint of economic efficiency, it is preferred to use a dry classifier.

The pulverization and the classification can be performed using a single apparatus. For example, a jet mill equipped with a dry classification function may be used to perform the pulverization and the classification. Alternatively, an apparatus in which a pulverizer and a classifier are independently arranged may be used as well. In this case, the pulverization and the classification can be performed continuously, or they can be performed discontinuously.

Moreover, the thus obtained carbonaceous material may be subjected to a post-treatment, such as a heat treatment or chemical or physical surface modification, in accordance with the intended use.

The thus obtained carbonaceous material may be dried as well. The drying is an operation performed for removing water and the like adsorbing to the carbonaceous material, and water and the like adsorbing to the carbonaceous material can be removed by, for example, heating the carbonaceous material. In addition to the heating or instead of the heating, the drying can be performed by means of, for example, pressure reduction, reduced-pressure heating or freezing so as to remove water and the like adsorbing to the carbonaceous material.

From the standpoint of removing water adsorbing to the carbonaceous material, the drying temperature is preferably 100 to 330° C., more preferably 110 to 300° C., still more preferably 120 to 250° C.

The drying time varies depending on the drying temperature to be employed; however, from the standpoint of removing water adsorbing to the carbonaceous material, it is preferably 0.1 hours or longer, more preferably 0.5 hours or longer, still more preferably 1 hour or longer. Further, from the standpoint of economic efficiency, the drying time is preferably 24 hours or shorter, more preferably 12 hours or shorter, still more preferably 6 hours or shorter.

The drying can be performed at normal pressure or under a reduced-pressure atmosphere. When the drying is performed at normal pressure, the drying is preferably performed under an atmosphere of an inert gas such as nitrogen gas or argon gas, or under an air atmosphere having a dew point of −20° C. or lower.

The present invention also provides: an electrode for electric double-layer capacitors, which comprises the carbonaceous material of the present invention; and an electric double-layer capacitor comprising this electrode. The electrode for electric double-layer capacitors according to the present invention can be produced by mixing the carbonaceous material of the present invention with a binder and, as required, a conductive agent and subsequently molding the resulting mixture.

The electrode for electric double-layer capacitors according to the present invention not only suppresses an increase in the resistance of an electric double-layer capacitor but also improves the durability such as performance retention rate and increases the withstand voltage. Further, the electrode for electric double-layer capacitors according to the present invention can be suitably utilized as an electrode for electric double-layer capacitors and lithium ion capacitors that are demanded to have high durability.

EXAMPLES

The present invention will now be described in more detail by way of examples thereof; however, the present invention is not restricted thereto by any means. The physical property values in Examples and Comparative Examples were determined by the respective methods described below.
[Measurement of Specific Surface Area]

Using BELSORP-mini manufactured by MicrotracBEL Corp., a carbonaceous material of interest was heated under a nitrogen stream (nitrogen flow rate: 50 mL/min) at 300° C. for 3 hours, and the nitrogen adsorption-desorption isotherm of the carbonaceous material was measured at 77 K. The thus obtained adsorption-desorption isotherm was analyzed by a multi-point BET method, and the specific surface area was calculated from a straight line in a region of relative pressure $P/P_0$=0.01 to 0.1 on the thus obtained curve.

[Total Pore Volume and Average Pore Size]

Using BELSORP-mini manufactured by MicrotracBEL Corp., a carbonaceous material of interest was heated under a nitrogen stream (nitrogen flow rate: 50 mL/min) at 300° C. for 3 hours, and the nitrogen adsorption-desorption isotherm of the carbonaceous material was measured at 77 K. The total pore volume was determined from the nitrogen adsorption amount at a relative pressure $P/P_0$ of 0.99 on the thus obtained adsorption-desorption isotherm, and the average pore size was calculated based on the following formula from the thus determined total pore volume and the specific surface area determined by the above-described BET method.

Average pore size (nm)=Total pore volume (cm$^3$/g)/ Specific surface area (m$^2$/g)×4,000

[Measurement of Micropore Volume by MP Method]

Using BELSORP-mini manufactured by MicrotracBEL Corp., a carbonaceous material of interest was heated under a nitrogen stream (nitrogen flow rate: 50 mL/min) at 300° C. for 3 hours, and the nitrogen adsorption-desorption isotherm of the carbonaceous material was measured at 77 K. The volume of micropores was determined by applying the MP method to the thus obtained adsorption-desorption isotherm. For the analysis by the MP method, a standard isotherm for t-method analysis "NGCB-BEL.t" provided by MicrotracBEL Corp. was used.

[Measurement of Mesopore Volume by BJH Method]

Using BELSORP-mini manufactured by MicrotracBEL Corp., a carbonaceous material of interest was heated under a nitrogen stream (nitrogen flow rate: 50 mL/min) at 300° C. for 3 hours, and the nitrogen adsorption-desorption isotherm of the carbonaceous material was measured at 77 K. The volume of mesopores was determined by applying the BJH method to the thus obtained desorption isotherm.

[Measurement of Tap Density]

A carbonaceous material of interest was dried at 120° C. under a reduced-pressure atmosphere (−95 kPa or less in terms of gauge pressure) for at least 12 hours and subsequently filled into a measuring container (100-ml graduated cylinder) to a volume of 100 ml, after which the weight of the carbonaceous material was measured. The container was covered with a lid, set in TAPDENSER KYT-4000 manufactured by Seishin Enterprise Co., Ltd. equipped with a 40-mm spacer, and then tapped 1,000 times. From the weight of the carbonaceous material and the volume measured after the tapping, the tap density was determined based on the following formula.

Tap density (g/cm$^3$)=Weight of carbonaceous material (g)/Volume after tapping (cm$^3$)

[Metal Content]

The elemental potassium content and the elemental iron content can be measured by, for example, the following method. First, calibration curves are prepared for the elemental potassium content and the elemental iron content using a standard liquid having known concentrations. Then, a pulverized sample to be measured was dried at 115° C. for 3 hours and 0.1 g of the thus dried sample was placed in a decomposition vessel, followed by addition of 10 ml of nitric acid thereto and mixing, after which the sample was dissolved using a microwave sample pretreatment apparatus ("DISCOVER SP-D80" manufactured by CEM Corporation). The resulting solution was taken out and diluted to 25 ml to prepare a measurement solution, which was subsequently analyzed by an ICP emission spectrometer ("iCAP6200" manufactured by Thermo Fisher Scientific K.K.). The concentrations of potassium and iron were determined from the thus obtained values and the above-prepared calibration curves, and the elemental potassium content and the elemental iron content were calculated using the following formula:

$$\text{Metal content (ppm)} = \frac{\{\text{Metal concentration determined by } ICP \text{ emission spectral analysis (mg/L)} \times 25 \times 1{,}000\}}{\{\text{Sample weight (g)} \times 1{,}000\}}$$

[Preparation of Test Electrode]

A carbonaceous material for electric double-layer capacitors, a conductive agent and a binder, which are members constituting an electrode, were used after at least 16 hours of preliminary vacuum-drying at 120° C. under a reduced-pressure atmosphere (0.1 KPa or less).

The carbonaceous material for electric double-layer capacitors, the conductive agent and the binder were weighed at a ratio of 81:9:10 [(mass of carbonaceous material):(mass of conductive agent):(mass of binder)] and then kneaded. A conductive carbon black "DENKA BLACK Granule" manufactured by Denka Co., Ltd. was used as the conductive agent, and a polytetrafluoroethylene "6J" manufactured by Du Pont-Mitsui Fluorochemicals Co., Ltd. was used as the binder. After the kneading, the resultant was cut into flakes of 1 mm square or smaller in size so as to attain further homogenization, and a pressure of 400 kg/cm$^2$ was applied thereto using a coin molding machine, whereby a coin-shaped secondary molded article was obtained. The thus obtained secondary molded article was molded into the form of a sheet having a thickness of 160 μm±5% using a roll press and subsequently cut out in a prescribed size (30 mm×30 mm) to prepare an electrode composition 1 illustrated in FIG. 1. Then, the thus obtained electrode composition 1 was dried at 120° C. under a reduced-pressure atmosphere for at least 16 hours, and the mass, the sheet thickness and the dimensions thereof were measured before being used in the below-described measurements.

[Preparation of Electrode Cell to be Measured]

As illustrated in FIG. 2, a conductive adhesive 2 "HITASOL GA-703" manufactured by Hitachi Chemical Co., Ltd. was coated at a thickness of 100 μm on an etching aluminum foil 3 manufactured by Hohsen Corp. Further, as illustrated in FIG. 3, the etching aluminum foil 3 coated with the conductive adhesive 2 was adhered with the sheet-form electrode composition 1 which had been cut previously. Then, an aluminum tab 4 having a sealant 5, which was manufactured by Hohsen Corp., was welded to the etching aluminum foil 3 using an ultrasonic welding machine. Thereafter, the resultant was vacuum-dried at 120° C. to obtain a polarizable electrode 6 equipped with an aluminum current collector.

As illustrated in FIG. 4, an aluminum-laminated resin sheet manufactured by Hohsen Corp. was cut out in a rectangular shape (200 mm in length×60 mm in width) and folded in half, and the resultant was thermally press-bonded on one side ((1) in FIG. 4) to prepare a pouch-like outer package sheet 7 whose remaining two sides were open. Two pieces of the above-described polarizable electrodes 6 were superimposed with each other via a cellulose separator "TF-40" (not illustrated) manufactured by Nippon Kodoshi Corporation to prepare a laminate. This laminate was inserted into the outer package sheet 7, and the polarizable electrodes 6 were immobilized by thermally press-bonding one side ((2) in FIG. 5) with which the tab 4 was in contact. Then, the resultant was vacuum-dried at 120° C. under a reduced-pressure atmosphere for at least 16 hours, and an electrolyte solution was injected thereto in a dry box having an argon atmosphere (dew point: −90° C. or lower). As the electrolyte solution, a propylene carbonate solution containing 1.5 mol/L of triethylmethyl ammonium tetrafluoroborate manufactured by Toyo Gosei Co., Ltd. was used. After immersing the laminate into the electrolyte solution in the outer package sheet 7, the remaining one side ((3) in FIG. 5) of the outer package sheet 7 was thermally press-bonded to prepare an electric double-layer capacitor 8 illustrated in FIG. 5.

[Measurement of Capacitance]

Using "CAPACITOR TESTER PFX2411" manufactured by Kikusui Electronics Corp., the thus obtained electric double-layer capacitor 8 was charged with a constant current of 200 mA per electrode surface area at 25° C. and −30° C. until the voltage reached 3.0 V. The electric double-layer capacitor 8 was further subjected to auxiliary charging under a constant voltage of 3.0 V for 30 minutes and, after the completion thereof, the electric double-layer capacitor 8 was discharged at 25 mA. From the thus obtained discharge curve data, the capacitance (F) was calculated using an energy conversion method. Specifically, after the charging, the discharging was performed until the voltage was reduced to zero, and the capacitance (F) was calculated from the energy that was discharged at this point. Then, the capacitance (F) was divided by the mass of the carbonaceous material of the electrodes and by the volume of the electrodes to determine the capacitance (F/g) and the capacitance (F/cc), respectively.

[Durability Test]

As for a durability test, after the above-described measurement of capacitance, the capacitor 8 was retained in a 60° C. thermostat bath for 1,000 hours with a voltage of 3.0 V being applied thereto, and the capacitance was subsequently measured at 25° C. and −30° C. in the same manner as described above. From the capacitance measured before and after the durability test, the capacity retention rate was calculated for each temperature in accordance with the following formula. A time point after the initiation of the application of a voltage of 3.0 V in the 60° C. thermostat bath and subsequent 25-hour preconditioning operation was defined as "before durability test", and a time point after the 1,000-hour retention was defined as "after durability test".

$$\text{Capacity retention rate (\%)} = \frac{\text{Capacitance per mass of carbonaceous material after durability test}}{\text{Capacitance per mass of carbonaceous material before durability test}} \times 100$$

[Measurement of Resistance]

As for the measurement of resistance, using an electrochemical measurement device (VSP, manufactured by Bio-Logic Science Instruments SAS), an amplitude of 0 V±mV was applied at 25° C. and −30° C. in accordance with a constant-voltage AC impedance measuring method, and the measurement was performed in a frequency range of 4 mHz to 1 MHz, whereby a Bode-Plot showing the relationship between frequency and impedance was obtained. In this Bode-Plot, the difference between the resistance at 1 Hz and the resistance at 1,000 Hz (hereinafter, also referred to as "1-1,000 Hz resistance difference") was determined as the resistance associated with charge transfer (electrode reaction and ion adsorption-desorption), and the changes in resistance were compared.

Example 1

A char produced from a coconut shell made in Philippines (specific surface area: 370 m$^2$/g) was subjected to primary activation with a combination of a propane combustion gas and water vapor (water vapor partial pressure: 35%) at 850° C. until the below-described specific surface area was attained, whereby a primary-activated granular carbon having a specific surface area of 1,660 m$^2$/g, an elemental potassium content of 10,546 ppm and an elemental iron content of 320 ppm was obtained. Subsequently, the thus obtained primary-activated granular carbon was washed with hydrochloric acid (concentration: 0.5 N, diluent: ion exchanged water) at a temperature of 70° C. for 30 minutes and then thoroughly washed with ion exchanged water for removal of residual acid, after which the resultant was dried to obtain a primary-washed granular activated carbon having an elemental potassium content of 81 ppm and an elemental iron content of 19 ppm. This granular activated carbon was further subjected to secondary activation with a propane combustion gas (water vapor partial pressure: 15%) at 950° C. until the below-described specific surface area was attained, whereby a secondary-activated granular carbon having a specific surface area of 2,053 m$^2$/g, an average pore size of 2.60 nm, an elemental potassium content of 105 ppm and an elemental iron content of 26 ppm was obtained. The thus obtained secondary-activated granular carbon was washed with an acid in the same manner as the primary washing and subsequently dried, after which a heat treatment was performed thereon at 700° C. to obtain a granular activated carbon having an elemental potassium content of 27 ppm and an elemental iron content of 11 ppm. This granular activated carbon was finely pulverized to an average particle size of 6 μm so as to obtain a carbonaceous material (1) having a specific surface area of 2,068 m$^2$/g and an average pore size of 2.60 nm. Various physical properties of the thus obtained carbonaceous material (1) were measured. The results thereof are shown in Table 1. It is noted here that the average particle size was measured using "MICROTRAC MT3000" manufactured by Nikkiso Co., Ltd.

In accordance with the above-described electrode preparation method, an electrode composition (1) was obtained using the carbonaceous material (1), and a polarizable electrode (1) was prepared using the electrode composition (1). Further, an electric double-layer capacitor (1) was prepared using the polarizable electrode (1). For the thus obtained electric double-layer capacitor (1), the measurement of capacitance, the durability test, and the measurement of resistance were performed in accordance with the above-described respective methods. The measurement results of the electric double-layer capacitor (1) are shown in Tables 2 and 3.

Example 2

A primary-activated granular carbon was obtained in the same manner as in Example 1. Subsequently, the thus obtained primary-activated granular carbon was washed with hydrochloric acid (concentration: 0.7 N, diluent: ion exchanged water) at a temperature of 70° C. for 30 minutes and then thoroughly washed with ion exchanged water, after which the resultant was dried to obtain a primary-washed granular activated carbon having an elemental potassium content of 31 ppm and an elemental iron content of 11 ppm. This granular activated carbon was further subjected to secondary activation with a propane combustion gas (water vapor partial pressure: 15%) at 910° C. until the below-described specific surface area was attained, whereby a secondary-activated granular carbon having a specific surface area of 2,289 m$^2$/g, an average pore size of 2.31 nm, an elemental potassium content of 49 ppm and an elemental iron content of 18 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 13 ppm and an elemental iron content of 10 ppm. This granular activated carbon was finely pulverized to an average particle size of 6 μm so as to obtain a carbonaceous material (2) having a specific surface area of 2,290 m$^2$/g and an average pore size of 2.32 nm. Various physical properties of the thus obtained carbonaceous material (2) were measured. The results thereof are shown in Table 1.

An electrode composition (2), a polarizable electrode (2) and an electric double-layer capacitor (2) were prepared in the same manner as in Example 1. Various measurements were also performed in the same manner as in Example 1. The results thereof are shown in Tables 2 and 3.

Example 3

A primary-activated granular carbon was obtained in the same manner as in Example 1. Subsequently, the thus obtained primary-activated granular carbon was washed with hydrochloric acid (concentration: 0.3 N, diluent: ion exchanged water) at a temperature of 70° C. for 30 minutes and then thoroughly washed with ion exchanged water, after which the resultant was dried to obtain a primary-washed granular activated carbon having an elemental potassium content of 105 ppm and an elemental iron content of 90 ppm. This granular activated carbon was further subjected to secondary activation with a propane combustion gas (water vapor partial pressure: 25%) at 930° C. until the below-described specific surface area was attained, whereby a secondary-activated granular carbon having a specific surface area of 2,202 m$^2$/g, an average pore size of 2.46 nm, an elemental potassium content of 151 ppm and an elemental iron content of 136 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 31 ppm and an elemental iron content of 24 ppm. This granular activated carbon was finely pulverized to an average particle size of 6 μm so as to obtain a carbonaceous material (3) having a specific surface area of 2,215 m$^2$/g and an average pore size of 2.46 nm. Various physical properties of the thus obtained carbonaceous material (3) were measured. The results thereof are shown in Table 1.

An electrode composition (3), a polarizable electrode (3) and an electric double-layer capacitor (3) were prepared in the same manner as in Example 1. Various measurements were also performed in the same manner as in Example 1. The results thereof are shown in Tables 2 and 3.

Example 4

A char produced from a coconut shell made in Philippines (specific surface area: 370 m$^2$/g) was subjected to primary activation with a combination of a propane combustion gas and water vapor (water vapor partial pressure: 35%) at 850° C. until the below-described specific surface area was attained, whereby a primary-activated granular carbon having a specific surface area of 1,120 m$^2$/g, an elemental potassium content of 9,290 ppm and an elemental iron content of 303 ppm was obtained. Subsequently, the thus obtained primary-activated granular carbon was washed with an acid in the same manner as the primary washing of Example 1 and then dried to obtain a primary-washed granular activated carbon having an elemental potassium content of 370 ppm and an elemental iron content of 91 ppm. This granular activated carbon was further subjected to secondary activation with a propane combustion gas (water vapor partial pressure: 15%) at 910° C. until the below-described specific surface area was attained, whereby a secondary-activated granular carbon having a specific surface area of 2,184 m$^2$/g, an average pore size of 2.22 nm, an elemental potassium content of 974 ppm and an elemental iron content of 239 ppm was obtained. The thus obtained secondary-activated granular carbon was washed with an acid in the same manner as the secondary washing of Example 1 and subsequently dried to obtain a secondary-washed granular activated carbon having an elemental potassium content of 43 ppm and an elemental iron content of 31 ppm. This granular activated carbon was further subjected to tertiary activation with a propane combustion gas (water vapor partial pressure: 15%) at 950° C. until the below-described specific surface area was attained, whereby a tertiary-activated granular carbon having a specific surface area of 2,333 m$^2$/g, an average pore size of 2.47 nm, an elemental potassium content of 47 ppm and an elemental iron content of 34 ppm was obtained. The thus obtained tertiary-activated granular carbon was washed with an acid in the same manner as the secondary washing of Example 1 and subsequently dried, after which a heat treatment was performed thereon at 700° C. to obtain a granular activated carbon having an elemental potassium content of 28 ppm and an elemental iron content of 19 ppm. This granular activated carbon was finely pulverized to an average particle size of 6 μm so as to obtain a carbonaceous material (4) having a specific surface area of 2,345 m$^2$/g and an average pore size of 2.47 nm. Various physical properties of the thus obtained carbonaceous material (4) were measured. The results thereof are shown in Table 1.

An electrode composition (4), a polarizable electrode (4) and an electric double-layer capacitor (4) were prepared in the same manner as in Example 1. Various measurements were also performed in the same manner as in Example 1. The results thereof are shown in Tables 2 and 3.

Example 5

A primary-activated granular carbon was obtained in the same manner as in Example 4. For the purpose of reducing the amount of residual impurities as compared to Example 4, the thus obtained primary-activated granular carbon was subsequently washed with hydrochloric acid (concentration: 1.0 N, diluent: ion exchanged water) at a temperature of 70° C. for 60 minutes and then thoroughly washed with ion exchanged water, after which the resultant was dried to obtain a primary-washed granular activated carbon having an elemental potassium content of 102 ppm and an elemental iron content of 43 ppm. This granular activated carbon was further subjected to secondary activation with a propane combustion gas (water vapor partial pressure: 15%) at 930° C. until the below-described specific surface area was attained, whereby a secondary-activated granular carbon having a specific surface area of 2,239 m²/q, an average pore size of 2.34 nm, an elemental potassium content of 264 ppm and an elemental iron content of 117 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 19 ppm and an elemental iron content of 13 ppm. This granular activated carbon was finely pulverized to an average particle size of 6 μm so as to obtain a carbonaceous material (5) having a specific surface area of 2,253 m²/g and an average pore size of 2.36 nm. Various physical properties of the thus obtained carbonaceous material (5) were measured. The results thereof are shown in Table 1.

An electrode composition (5), a polarizable electrode (5) and an electric double-layer capacitor (5) were prepared in the same manner as in Example 1. Various measurements were also performed in the same manner as in Example 1. The results thereof are shown in Tables 2 and 3.

Comparative Example 1

A primary-activated granular carbon was obtained in the same manner as in Example 1. For the purpose of confirming the effects of impurities, the thus obtained primary-activated granular carbon was, without primary washing, subjected to secondary activation with a propane combustion gas (water vapor partial pressure: 15%) at 910° C. until the below-described specific surface area was attained, whereby a secondary-activated granular carbon having a specific surface area of 2,220 m²/g, an average pore size of 2.14 nm, an elemental potassium content of 15,267 ppm and an elemental iron content of 487 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 27 ppm and an elemental iron content of 18 ppm. This granular activated carbon was finely pulverized to an average particle size of 6 μm so as to obtain a carbonaceous material (6) having a specific surface area of 2,230 m²/g and an average pore size of 2.15 nm. Various physical properties of the thus obtained carbonaceous material (6) were measured. The results thereof are shown in Table 1. As shown in Table 1, it is seen that execution of the secondary activation without primary washing makes the formation of desired pores difficult.

An electrode composition (6), a polarizable electrode (6) and an electric double-layer capacitor (6) were prepared in the same manner as in Example 1. Various measurements were also performed in the same manner as in Example 1. The results thereof are shown in Tables 2 and 3.

Comparative Example 2

A primary-washed granular activated carbon was obtained by performing primary activation and subsequent washing with an acid and drying in the same manner as in Example 2. For the purpose of confirming the effects of advancing the activation, this granular activated carbon was further subjected to secondary activation with a propane combustion gas (water vapor partial pressure: 15%) at 910° C. until the below-described specific surface area was attained, whereby a secondary-activated granular carbon having a specific surface area of 2,354 m²/g, an average pore size of 2.58 nm, an elemental potassium content of 49 ppm and an elemental iron content of 18 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 8 ppm and an elemental iron content of 16 ppm. This granular activated carbon was finely pulverized to an average particle size of 6 μm so as to obtain a carbonaceous material (7) having a specific surface area of 2,377 m²/g and an average pore size of 2.61 nm. Various physical properties of the thus obtained carbonaceous material (7) were measured. The results thereof are shown in Table 1.

An electrode composition (7), a polarizable electrode (7) and an electric double-layer capacitor (7) were prepared in the same manner as in Example 1. Various measurements were also performed in the same manner as in Example 1. The results thereof are shown in Tables 2 and 3. As shown in Tables 1 and 2, it is seen that excessive progress of the activation results in a decrease in the capacity per volume due to a drastic reduction in the density.

Comparative Example 3

A primary-washed granular activated carbon was obtained by performing primary activation and subsequent washing with an acid and drying in the same manner as in Example 1. This granular activated carbon was further subjected to secondary activation with a propane combustion gas (water vapor partial pressure: 15%) at 950° C. until the below-described specific surface area was attained, whereby a secondary-activated granular carbon having a specific surface area of 2,215 m²/g, an average pore size of 2.81 nm, an elemental potassium content of 117 ppm and an elemental iron content of 29 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 27 ppm and an elemental iron content of 15 ppm. This granular activated carbon was finely pulverized to an average particle size of 6 μm so as to obtain a carbonaceous material (8) having a specific surface area of 2,229 m²/g and an average pore size of 2.82 nm. Various physical properties of the thus obtained carbonaceous material (8) were measured. The results thereof are shown in Table 1.

An electrode composition (8), a polarizable electrode (8) and an electric double-layer capacitor (8) were prepared in the same manner as in Example 1. Various measurements were also performed in the same manner as in Example 1. The results thereof are shown in Tables 1 to 3. As in the case of Comparative Example 2, it is seen that excessive progress of the activation results in a decrease in the capacitance per volume due to a drastic reduction in the density.

Comparative Example 4

As a method of increasing mesopores, the method described in WO 2014/129410 is known. In accordance with this method, a primary-activated granular carbon obtained in the same manner as in Example 4, which was impregnated with 1.23% of calcium nitrate (0.3% in terms of calcium component), was subjected to secondary activation with a propane combustion gas (water vapor partial pressure: 15%) at 910° C. until the below-described specific surface area was attained, whereby a secondary-activated granular carbon having a specific surface area of 1,918 m²/g, an average pore size of 3.00 nm, an elemental potassium content of 18,230 ppm, an elemental calcium content of 7,067 ppm and an elemental iron content of 661 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 33 ppm and an elemental iron content of 25 ppm. This granular activated carbon was finely pulverized to an average particle size of 6 μm so as to obtain a carbonaceous material (9) having a specific surface area of 1,937 m²/g and an average pore size of 3.00 nm. Various physical properties of the thus obtained carbonaceous material (9) were measured. The results thereof are shown in Table 1.

An electrode composition (9), a polarizable electrode (9) and an electric double-layer capacitor (9) were prepared in the same manner as in Example 1. Various measurements were also performed in the same manner as in Example 1. The results thereof are shown in Tables 2 and 3. As shown in Tables 1 and 2, it is seen that, when a large amount of impurities such as calcium is contained, mesopores and larger pores develop more than necessary and the capacity per volume is consequently reduced.

Comparative Example 5

A primary-activated granular carbon was obtained in the same manner as in Example 4. For the purpose of confirming the effects of the extent of primary washing on the amount of residual impurities, the thus obtained primary-activated granular carbon was washed with hydrochloric acid (concentration: 0.001 N, diluent: ion exchanged water) at a temperature of 70° C. for 30 minutes and then thoroughly washed with ion exchanged water, after which the resultant was dried to obtain a primary-washed granular activated carbon having an elemental potassium content of 3,793 ppm and an elemental iron content of 152 ppm. This granular activated carbon was further subjected to secondary activation with a propane combustion gas (water vapor partial pressure: 15%) at 910° C. until the below-described specific surface area was attained, whereby a secondary-activated granular carbon having a specific surface area of 2,237 m²/g, an average pore size of 2.13 nm, an elemental potassium content of 10,336 ppm and an elemental iron content of 826 ppm was obtained. The thus obtained secondary-activated granular carbon was washed with an acid in the same manner as the secondary washing of Example 1 and subsequently dried, after which a heat treatment was performed thereon at 700° C. to obtain a granular activated carbon having an elemental potassium content of 41 ppm and an elemental iron content of 33 ppm. This granular activated carbon was finely pulverized to an average particle size of 6 μm so as to obtain a carbonaceous material (10) having a specific surface area of 2,247 m²/g and an average pore size of 2.14 nm. Various physical properties of the thus obtained carbonaceous material (10) were measured. The results thereof are shown in Table 1.

An electrode composition (10), a polarizable electrode (10) and an electric double-layer capacitor (10) were prepared in the same manner as in Example 1. Various measurements were also performed in the same manner as in Example 1. The results thereof are shown in Tables 2 and 3. As shown in Tables 1 and 2, it is seen that insufficient primary washing results in inadequate reduction in resistance due to the formation of pores similar to those of Comparative Example 1.

Reference Example 1

A primary-washed granular activated carbon was obtained by performing primary activation and subsequent washing with an acid and drying in the same manner as in Example 1. The thus obtained primary-activated granular activated carbon was subjected to a heat treatment at 700° C. to obtain a granular activated carbon having an elemental potassium content of 31 ppm and an elemental iron content of 17 ppm. This granular activated carbon was finely pulverized to an average particle size of 6 μm so as to obtain a carbonaceous material (11) having a specific surface area of 1,694 m²/g and an average pore size of 1.88 nm. An electrode composition (11), a polarizable electrode (11) and an electric double-layer capacitor (11) were prepared in the same manner as in Example 1. Various measurements were also performed in the same manner as in Example 1. The results thereof are shown in Tables 1 to 3.

TABLE 1

| | | BET specific surface area (m²/g) | Average particle size (nm) | MP method Pore volume (2 nm or smaller) (cm³/g) | MP method Pore volume ratio (1 to 2 nm/2 nm or smaller) (%) | BJH method Pore volume (2 to 50 nm) (cm³/g) | Total pore volume (cm³/g) | Tap density (g/cm³) |
|---|---|---|---|---|---|---|---|---|
| Example | 1 | 2,068 | 2.60 | 0.99 | 33.3 | 0.37 | 1.34 | 0.23 |
| | 2 | 2,290 | 2.32 | 1.18 | 35.4 | 0.19 | 1.33 | 0.23 |
| | 3 | 2,215 | 2.46 | 1.09 | 30.9 | 0.30 | 1.36 | 0.23 |
| | 4 | 2,345 | 2.47 | 1.26 | 47.8 | 0.21 | 1.45 | 0.23 |
| | 5 | 2,253 | 2.36 | 1.14 | 33.9 | 0.25 | 1.33 | 0.23 |
| Comparative Example | 1 | 2,230 | 2.15 | 1.10 | 23.3 | 0.15 | 1.20 | 0.26 |
| | 2 | 2,377 | 2.61 | 1.32 | 57.9 | 0.24 | 1.55 | 0.20 |
| | 3 | 2,229 | 2.82 | 1.16 | 51.9 | 0.43 | 1.57 | 0.21 |
| | 4 | 1,937 | 3.00 | 0.77 | 21.1 | 0.56 | 1.45 | 0.18 |
| | 5 | 2,247 | 2.14 | 1.10 | 23.4 | 0.15 | 1.20 | 0.26 |
| Reference Example 1 | | 1,694 | 1.88 | 0.61 | 9.7 | 0.10 | 0.80 | 0.35 |

TABLE 2

| | | Capacitance per mass of carbonaceous material (F/g) | | | | Capacitance per volume of carbonaceous material (F/cc) | | | | Capacity retention rate (%) | |
|---|---|---|---|---|---|---|---|---|---|---|---|
| | | Measurement temperature: 25° C. Durability test | | Measurement temperature: −30° C. Durability test | | Measurement temperature: 25° C. Durability test | | Measurement temperature: −30° C. Durability test | | | |
| | | before | after | before | after | before | after | before | after | 25° C. | −30° C. |
| Example | 1 | 31.1 | 28.4 | 29.0 | 25.4 | 11.6 | 10.5 | 10.8 | 9.5 | 91 | 88 |
| | 2 | 32.1 | 28.7 | 29.9 | 25.7 | 12.1 | 10.8 | 11.3 | 9.7 | 89 | 86 |
| | 3 | 32.0 | 29.2 | 29.6 | 26.0 | 11.8 | 10.8 | 10.9 | 9.6 | 91 | 88 |
| | 4 | 32.5 | 29.6 | 30.2 | 26.9 | 11.4 | 10.3 | 10.6 | 9.4 | 91 | 89 |
| | 5 | 32.1 | 28.7 | 29.8 | 25.9 | 12.0 | 10.7 | 11.1 | 9.7 | 89 | 87 |
| Comparative Example | 1 | 30.6 | 26.4 | 28.2 | 22.7 | 12.0 | 10.3 | 11.1 | 8.9 | 86 | 80 |
| | 2 | 31.9 | 28.4 | 29.0 | 25.5 | 10.3 | 9.6 | 9.8 | 8.6 | 89 | 88 |
| | 3 | 30.6 | 27.3 | 28.6 | 24.9 | 10.5 | 9.4 | 9.8 | 8.6 | 89 | 87 |
| | 4 | 30.7 | 25.8 | 28.0 | 20.9 | 11.6 | 9.8 | 10.6 | 7.9 | 84 | 75 |
| | 5 | 30.9 | 26.3 | 28.5 | 22.5 | 12.1 | 10.3 | 11.2 | 8.8 | 85 | 79 |
| Reference Example | 1 | 28.8 | 24.9 | 25.1 | 14.0 | 15.0 | 13.0 | 13.1 | 7.3 | 86 | 56 |

TABLE 3

| | | Resistance at 1 Hz (Re(Z)/Ohm) Measurement temperature: −30° C. Durability test | | Resistance at 1,000 Hz (Re(Z)/Ohm) Measurement temperature: −30° C. Durability test | | 1-1,000 Hz resistance difference (Re(Z)/Ohm) Measurement temperature: −30° C. Durability test | | Change in 1-1,000 Hz resistance difference before and after durability test: −30° C. |
|---|---|---|---|---|---|---|---|---|
| | | before | after | before | after | before | after | after − before |
| Example | 1 | 2.75 | 3.97 | 2.16 | 2.99 | 0.59 | 0.98 | 0.39 |
| | 2 | 2.66 | 4.27 | 2.12 | 3.24 | 0.54 | 1.03 | 0.49 |
| | 3 | 3.06 | 4.47 | 2.33 | 3.56 | 0.73 | 0.91 | 0.18 |
| | 4 | 3.27 | 4.94 | 2.52 | 3.68 | 0.75 | 1.26 | 0.50 |
| | 5 | 2.84 | 4.36 | 2.22 | 3.39 | 0.62 | 0.97 | 0.35 |
| Comparative Example | 1 | 3.10 | 5.08 | 2.41 | 3.51 | 0.68 | 1.57 | 0.89 |
| | 2 | 3.24 | 4.28 | 2.39 | 3.16 | 0.85 | 1.12 | 0.27 |
| | 3 | 3.23 | 3.93 | 2.33 | 2.88 | 0.90 | 1.05 | 0.15 |
| | 4 | 2.93 | 5.90 | 2.20 | 4.22 | 0.73 | 1.68 | 0.95 |
| | 5 | 3.08 | 5.06 | 2.40 | 3.50 | 0.68 | 1.56 | 0.88 |
| Reference Example | 1 | 3.43 | 8.98 | 2.27 | 5.24 | 1.16 | 3.75 | 2.58 |

<Initial Performance of Electric Double-Layer Capacitor, and Performance Evaluation after Durability Test>

In cases where the durability test is conducted as performance evaluation of an electric double-layer capacitor, the capacity and the resistance at normal temperature (25° C.) are generally evaluated before and after an acceleration test, and the changes in these properties are measured. However, such evaluation at normal temperature requires a long-term test for confirmation of deterioration phenomena. Accordingly, by evaluating the capacity and the resistance at a low temperature, the deterioration phenomena can be compared and confirmed promptly as compared to a case of performing the evaluation at a normal temperature. Deterioration of a capacitor is induced by deterioration of the members constituting the capacitor (e.g., electrodes, an electrolyte solution, and a binder) caused by electrochemical reactions.

Specifically, the following reactions are considered:
(1) decomposition of the electrolyte solution;
(2) hydrofluoric acid generation and side reaction, which are associated with decomposition of water remaining in the carbonaceous material and/or the electrolyte solution;
(3) change in pore size or blockage of pores due to formation of an SEI (Solid Electrolyte Interface) coating film at the electrode interface; and
(4) generation of gases associated with decomposition of residual water, oxidation of surface functional groups contained in the carbonaceous material, and deterioration of the electrolyte solution.

These phenomena are believed to induce deterioration of the capacitor, such as an increase in the resistance, a decrease in the capacitance, and swelling of the cell due to gas generation.

Particularly, in cases where the measurement and the comparison are performed at a low temperature, it is believed that the low temperature causes an increase in the viscosity of the electrolyte solution and, for example, deterioration of the electrode materials and the electrode interface and/or deterioration of the electrolyte solution are notably reflected in the evaluations of capacity, resistance and the like. From this standpoint, in the present invention, in order to clearly compare and examine the deterioration phenomena, the durability test (at 60° C., with a load of 3V for a prescribed time) was conducted and the deterioration state thereafter was compared mainly based on the evaluation at −30° C.

As shown in Table 2, it is seen that the electric double-layer capacitors (1) to (5), which were produced in Examples 1 to 5 using the polarizable electrodes (1) to (5) containing the carbonaceous material for electric double-layer capacitors according to the present invention, had equivalent or higher initial capacitance (capacitance per mass and capacitance per volume before the durability test) at both 25° C. and −30° C. as compared to the electric double-layer capacitors (6), (9) and (10) of Comparative Examples 1, 4 and 5, which were each produced using a carbonaceous material that was obtained without washing after the primary activation, or with selective increase in mesopores or washing with a weaker acid.

In addition, it is seen that the capacity retention rate was reduced at both 25° C. and −30° C. in the electric double-layer capacitors (6), (9) and (10) of Comparative Examples 1, 4 and 5. On the other hand, the electric double-layer capacitors (1) to (5) according to the present invention each exhibited a higher capacity retention rate at 25° C. as well as at −30° C.

In the electric double-layer capacitors (7) and (8) of Comparative Examples 2 and 3 which were each produced using a carbonaceous material obtained by allowing the activation thereof to proceed further, although the capacity retention rate was favorable, the capacitance per volume was low at both 25° C. and −30° C. and not at a level practical for the purpose of the present invention.

As shown in Table 3, the electric double-layer capacitors (1) to (5) according to the present invention were confirmed to have small 1-1,000 Hz resistance differences before and after the durability test as well as small changes in the 1-1,000 Hz resistance difference before and after the durability test. On the other hand, although the electric double-layer capacitors (6), (9) and (10) of Comparative Examples 1, 4 and 5 exhibited 1-1,000 Hz resistance differences comparable to those of the electric double-layer capacitors of Examples 1 to 5 before the durability test, it was conformed that the 1-1,000 Hz resistance difference notably increased after the durability test and the change in the resistance difference was thus large in the electric double-layer capacitors (6), (9) and (10). Moreover, in the electric double-layer capacitors (7) and (8) of Comparative Examples 2 and 3 which were each produced using a carbonaceous material obtained by allowing the activation thereof to proceed further, although the change in the resistance difference before and after the durability test was small, the capacitance per volume was low at both 25° C. and −30° C. and not at a practical level as described above in relation to Table 2. As described below in relation to FIG. 6, it is believed that charge transfer (electrode reaction and ion adsorption-desorption) has an influence on the durability and that the difference between the resistance at about 1 Hz and the resistance at about 1,000 Hz, which is shown in Table 2 and FIG. 6, is the resistance associated with charge transfer. In order to achieve good input-output characteristics, it is believed to be important that this resistance associated with charge transfer be low, rather than that the resistance at a specific frequency be low. Therefore, a small 1-1,000 Hz resistance difference indicates a small resistance associated with charge transfer and good input-output characteristics. In addition, a small change in the resistance difference before and after the durability test indicates high durability.

The results obtained in Examples and Comparative Examples will now be described referring to the drawings. It is noted here that the results of Comparative Examples 2 and 3 are not shown in the drawings since the capacitance per volume was low as described above. In addition, the results of Comparative Example 5 are also not shown in the drawings since they were substantially the same as those of Comparative Example 1.

FIG. 6 (Bode-Plot) shows the relationships between the frequency and the resistance of the respective carbonaceous materials in constant-voltage AC impedance measurement performed at −30° C. In the Bode-Plot obtained by measuring the constant-voltage AC impedance with varying frequency, the resistance in a range of up to about 1 Hz is considered as the resistance associated with mass transfer, and the resistance in a range of higher than about 1,000 Hz is considered as the resistance associated with electronic conduction. Further, it is believed that the resistance difference in a range of about 1 Hz to about 1,000 Hz is associated with charge transfer (electrode reaction and ion adsorption-desorption) relating to the input-output characteristics and durability of the electric double-layer capacitors. In the present specification, the difference between the resistance at 1 Hz and the resistance at 1,000 Hz (1-1,000 Hz resistance difference) was determined as the resistance associated with charge transfer (electrode reaction and ion adsorption-desorption), and the changes in resistance were compared. As shown in Table 3 and FIG. 6, it is seen that, in the electric double-layer capacitors (1) to (5) according to the present invention, the 1-1,000 Hz resistance difference was small and the resistance was reduced in a range of 1 Hz to 1,000 Hz. In other words, it is seen that the electric double-layer capacitor of the present invention is effective in reducing the charge transfer resistance.

FIG. 7 shows the changes with time in the 1-1,000 Hz resistance difference in constant-voltage AC impedance measurement performed at −30° C. Comparing Comparative Examples 1 and 4 with Examples 1 and 2, it is seen that the increase in the resistance difference with time was smaller in Examples 1 and 2 than in Comparative Examples 1 and 4 and Reference Example 1. From this, it is seen that an increase in resistance with time is suppressed and the durability of an electric double-layer capacitor is improved by using the carbonaceous material of the present invention.

FIG. 8 shows the relationships among the average pore size of the respective carbonaceous materials, the capacitance per mass of the respective carbonaceous materials measured at −30° C. after the durability test, and the 1-1,000 Hz resistance difference. Further, FIG. 9 shows the relationships among the average pore size of the respective carbonaceous materials, the capacitance per volume of the respective carbonaceous materials measured at −30° C. after the durability test, and the 1-1,000 Hz resistance difference.

As shown in FIGS. 8 and 9, it is seen that, in Examples 1 and 2 where the average pore size was 2.2 to 2.6 nm, the change between the 1-1,000 Hz resistance difference and the 1-1,000 Hz resistance difference after 1,000 hours (the amount of change in resistance difference that is represented by arrows in FIGS. 8 and 9) was small as compared to Comparative Examples 1, 3 and 4 and Reference Example 1. Meanwhile, for example, when the average pore size was larger than 2.6 nm as in the cases of Comparative Examples 3 and 4, although the change between the 1-1,000 Hz resistance difference at 0 hours and the 1-1,000 Hz resistance difference after 1,000 hours was small, the capacity per volume was decreased due to reduction in density as shown in FIG. 9.

FIG. 10 shows the relationships among the ratio of the volume of micropores having a pore size of 1 to 2 nm with respect to the volume of micropores having a pore size of 2 nm or smaller in the respective carbonaceous materials, which is determined by the MP method, the capacitance per mass of the respective carbonaceous materials measured at −30° C. after the durability test, and the 1-1,000 Hz resistance difference. Further, FIG. 11 shows the relationships among the ratio of the volume of micropores having a pore size of 1 to 2 nm with respect to the volume of micropores having a pore size of 2 nm or smaller in the respective carbonaceous materials, which is determined by the MP method, the capacitance per volume of the respective carbonaceous materials measured at −30° C. after the durability test, and the 1-1,000 Hz resistance difference.

As shown in FIGS. 10 and 11, it is seen that the change between the 1-1,000 Hz resistance difference at 0 hours and the 1-1,000 Hz resistance difference after 1,000 hours (the amount of change in resistance difference that is represented by arrows in FIGS. 10 and 11) was small in Examples 3 and 4 where the ratio A was in a range of 25 to 50%. On the other hand, when the ratio of the volume of micropores having a pore size of 1 to 2 nm was lower than 25% as in the cases of Comparative Examples 1 and 4, the change between the 1-1,000 Hz resistance difference at 0 hours and the 1-1,000 Hz resistance difference after 1,000 hours was increased, and the capacity after 1,000 hours was reduced. In addition, when the ratio of the volume of micropores having a pore size of 1 to 2 nm was higher than 50% as in the cases of Comparative Examples 2 and 3, although the change between the 1-1,000 Hz resistance difference at 0 hours and the 1-1,000 Hz resistance difference after 1,000 hours was small, the capacity per volume was decreased due to reduction in density, and the difference between the capacity at 0 hours and the capacity after 1,000 hours was increased. It was demonstrated that the electric double-layer capacitor of the present invention is capable of maintaining sufficient capacity after a durability test and that, since the resistance difference is controlled to be small even in a low temperature range, the electric double-layer capacitor of the present invention is capable of exerting its performance in the same manner as in a normal temperature condition, even in a situation where deterioration is facilitated such as a cold region.

From the above, it is apparent that an electric double-layer capacitor having excellent durability can be obtained by using the carbonaceous material for electric double-layer capacitors according to the present invention in an electrode(s).

DESCRIPTION OF SYMBOLS

1: electrode composition
2: conductive adhesive
3: etching aluminum foil
4: tab
5: sealant
6: polarizable electrode
7: outer package sheet
8: electric double-layer capacitor

The invention claimed is:

1. A carbonaceous material, which is based on a plant-derived carbon precursor, having
a BET specific surface area of from 1,900 to 2,500 m$^2$/g,
an average pore size of from 2.2 to 2.6 nm as determined by a nitrogen adsorption method,
a volume of micropores having a pore size of 2 nm or smaller of from 0.84 to 1.30 cm$^3$/g as determined by an MP method,
a ratio of a volume of micropores having a pore size of from 1 to 2 nm with respect to the volume of the micropores having a pore size of 2 nm or smaller of from 25 to 50% as determined by the MP method,
a volume of mesopores having a pore size of 2 to 50 nm of 0.16 to 0.4 cm$^3$/g as determined by a BJH method, and
having a tap density of from 0.21 to 0.25 g/cm$^3$.

2. The carbonaceous material according to claim 1, having a total pore volume of from 1.0 to 1.5 cm$^3$/g as calculated from a nitrogen adsorption amount at a relative pressure $P/P_0$ of 0.99 on a nitrogen adsorption-desorption isotherm.

3. The carbonaceous material according to claim 1, wherein the volume of mesopores having a pore size of 2 to 50 nm is 0.19 to 0.35 cm$^3$/g.

4. The carbonaceous material according to claim 1, wherein the carbon precursor is derived from a coconut shell.

5. A method of producing the carbonaceous material according to claim 1, the method comprising:
performing carbonization, primary activation with water vapor, washing, and secondary activation with water vapor on the plant-derived carbon precursor to obtain the carbonaceous material,
wherein an elemental potassium content in the carbonaceous material after the washing is 500 ppm or less, and
an elemental iron content in the carbonaceous material after the washing is 200 ppm or less.

6. An electrode, comprising:
the carbonaceous material according to claim 1.

7. An electric double-layer capacitor, comprising:
the electrode according to claim 2.

8. The carbonaceous material according to claim 1, wherein the BET specific surface area is from 1,950 to 2,450 m$^2$/g.

9. The carbonaceous material according to claim 1, wherein the BET specific surface area is from 2,000 to 2,400 m$^2$/g.

10. The carbonaceous material according to claim 1, wherein the average pore size is from 2.25 to 2.55 nm.

11. The carbonaceous material according to claim 1, wherein the average pore size is from 2.3 to 2.5 nm.

12. The carbonaceous material according to claim 1, wherein the volume of micropores having a pore size of 2 nm or smaller is from 0.90 to 1.25 cm$^3$/g.

13. The carbonaceous material according to claim 1, wherein the volume of micropores having a pore size of 2 nm or smaller is from 1.00 to 1.20 cm$^3$/g.

14. The carbonaceous material according to claim 1, wherein the ratio of a volume of micropores having a pore size of from 1 to 2 nm with respect to the volume of the micropores having a pore size of 2 nm or smaller is from 25 to 48%.

15. The carbonaceous material according to claim 1, wherein the ratio of a volume of micropores having a pore size of from 1 to 2 nm with respect to the volume of the micropores having a pore size of 2 nm or smaller is from 27 to 45%.

16. The carbonaceous material according to claim 1, wherein the volume of mesopores having a pore size of 2 to 50 nm is 0.18 to 0.38 cm$^3$/g.

* * * * *